United States Patent
Nishimura et al.

(10) Patent No.: US 11,519,331 B2
(45) Date of Patent: Dec. 6, 2022

(54) GAS TURBINE APPARATUS AND MANUFACTURING METHOD FOR THE SAME, AND OPERATION METHOD FOR GAS TURBINE APPARATUS

(71) Applicant: Mitsubishi Power Ltd., Yokohama (JP)

(72) Inventors: Hidehiko Nishimura, Yokohama (JP); Kengo Okamoto, Yokohama (JP); Yoshifumi Iwasaki, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/065,768

(22) Filed: Oct. 8, 2020

(65) Prior Publication Data
US 2021/0222622 A1 Jul. 22, 2021

(30) Foreign Application Priority Data
Oct. 25, 2019 (JP) .............................. JP2019-194006

(51) Int. Cl.
*F02C 7/00* (2006.01)
*F02C 7/18* (2006.01)

(52) U.S. Cl.
CPC .......... *F02C 7/185* (2013.01); *F05D 2230/60* (2013.01); *F05D 2260/20* (2013.01)

(58) Field of Classification Search
CPC .... F02C 7/18; F02C 7/185; F02C 9/18; F02C 7/052; F05D 2260/607
See application file for complete search history.

(56) References Cited

U.S. PATENT DOCUMENTS

| | | | |
|---|---|---|---|
| 2017/0138201 A1* | 5/2017 | Takata | .................... F02C 9/52 |
| 2018/0010520 A1* | 1/2018 | Iwasaki | .................. F01D 25/12 |
| 2018/0340468 A1* | 11/2018 | Takamura | .............. F01D 25/14 |
| 2019/0153963 A1 | 5/2019 | Kitaguchi | |
| 2020/0332725 A1* | 10/2020 | Smith | ................. F04D 27/0223 |

FOREIGN PATENT DOCUMENTS

| | | |
|---|---|---|
| JP | 2004-27874 | 1/2004 |
| JP | 2017-78362 | 4/2017 |
| JP | 2018-009459 | 1/2018 |

* cited by examiner

*Primary Examiner* — Katheryn A Malatek
(74) *Attorney, Agent, or Firm* — Wenderoth, Lind & Ponack, L.L.P.

(57) ABSTRACT

A gas turbine apparatus includes a turbine configured to be driven by a combustion gas from a combustor, an exhaust passage, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, a bypass line for introducing the fluid from the cooling part to the exhaust passage by bypassing the turbine, the bypass line branching from the return line, and a communication state switching part for controlling a communication state between the extraction line and the combustor casing via the return line, and a communication state between the extraction line and the exhaust passage via the bypass line.

13 Claims, 10 Drawing Sheets

GAS TURBINE APPARATUS AND MANUFACTURING METHOD FOR THE SAME, AND OPERATION METHOD FOR GAS TURBINE APPARATUS

TECHNICAL FIELD

The present disclosure relates to a gas turbine apparatus and a manufacturing method for the same, and an operation method for the gas turbine apparatus.

BACKGROUND

A component (for example, a turbine rotor) exposed to a high-temperature gas in a gas turbine may be cooled by using a cooling fluid.

For example, Patent Document 1 discloses a gas turbine including a cooler (cooling device) for cooling compressed air. In the gas turbine, compressed air extracted from a compressor is cooled by the cooler, and the cooled air thus generated is supplied to the turbine.

CITATION LIST

Patent Literature

Patent Document 1: JP2017-78362A

SUMMARY

Meanwhile, the gas turbine may be operated to change an output in accordance with a fluctuation in required load. In the gas turbine, a CO concentration in a flue gas tends to increase if a turbine inlet temperature decreases. Thus, in an operation at a relatively low load, it is desired that the turbine inlet temperature is maintained high in order to suppress an increase in CO emission.

In this regard, the gas turbine of Patent Document 1 is provided with a turbine bypass line for discharging the compressed air from the compressor to a turbine outlet by bypassing a combustor and the turbine. It is considered that using the turbine bypass line, a part of the compressed air is caused to bypass the combustor and the turbine, and is discharged without being used as combustion air, making it possible to reduce the combustion air and to increase the turbine inlet temperature.

However, if the above-described turbine bypass line is provided, for example, a pipe forming the turbine bypass line needs to be connected to a casing, increasing the cost of construction.

In view of the above, an object of at least one embodiment of the present invention is to provide a gas turbine apparatus capable of suppressing an increase in CO emission during an operation at a relatively low load, while suppressing an increase in cost and a manufacturing method for the same, and an operation method for the gas turbine apparatus.

A gas turbine apparatus according to at least one embodiment of the present invention includes a turbine configured to be driven by a combustion gas from a combustor, an exhaust passage configured to allow exhaust air from the turbine to flow, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, a bypass line for introducing the fluid from the cooling part to the exhaust passage by bypassing the turbine, the bypass line branching from the return line, and a communication state switching part for controlling a communication state between the extraction line and the combustor casing via the return line, and a communication state between the extraction line and the exhaust passage via the bypass line. The communication state switching part is configured to, during an operation of the gas turbine apparatus at a first load, cause the extraction line and the combustor casing to communicate with each other via the return line, and shut off a communication between the extraction line and the exhaust passage via the bypass line, and, during an operation of the gas turbine apparatus at a second load which is lower than the first load, shut off a communication between the extraction line and the combustor casing via the return line, and cause the extraction line and the exhaust passage to communicate with each other via the bypass line.

Moreover, a manufacturing method for a gas turbine apparatus, which includes a turbine configured to be driven by a combustion gas from a combustor, an exhaust passage configured to allow exhaust air from the turbine to flow, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, and a bypass line for introducing the fluid from the cooling part to the exhaust passage by bypassing the turbine, the bypass line branching from the return line, according to at least one embodiment of the present invention includes a step of connecting an upstream end of a bypass pipe to the return line or another line communicating with the return line to form the bypass line by the bypass pipe.

Moreover, an operation method for a gas turbine apparatus, which includes a turbine configured to be driven by a combustion gas from a combustor, an exhaust passage configured to allow exhaust air from the turbine to flow, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, and a bypass line for introducing the fluid from the cooling part to the exhaust passage by bypassing the turbine, the bypass line branching from the return line, according to at least one embodiment of the present invention includes, during an operation of the gas turbine apparatus at a first load, a step of operating the gas turbine apparatus in a state in which the extraction line and the combustor casing are caused to communicate with each other via the return line, and the communication between the extraction line and the exhaust passage via the bypass line is shut off, and a step of shutting off the communication between the extraction line and the combustor casing via the return line, and causing the extraction line and the exhaust passage to communicate with each other via the bypass line, at a time of switching from the operation of the gas turbine apparatus at the first load to an operation at a second load which is lower than the first load.

According to at least one embodiment of the present invention, a gas turbine apparatus capable of suppressing an increase in CO emission during an operation at a relatively low load, while suppressing an increase in cost and a manufacturing method for the same, and an operation method for the gas turbine apparatus are provided.

DETAILED DESCRIPTION

Figure 1:
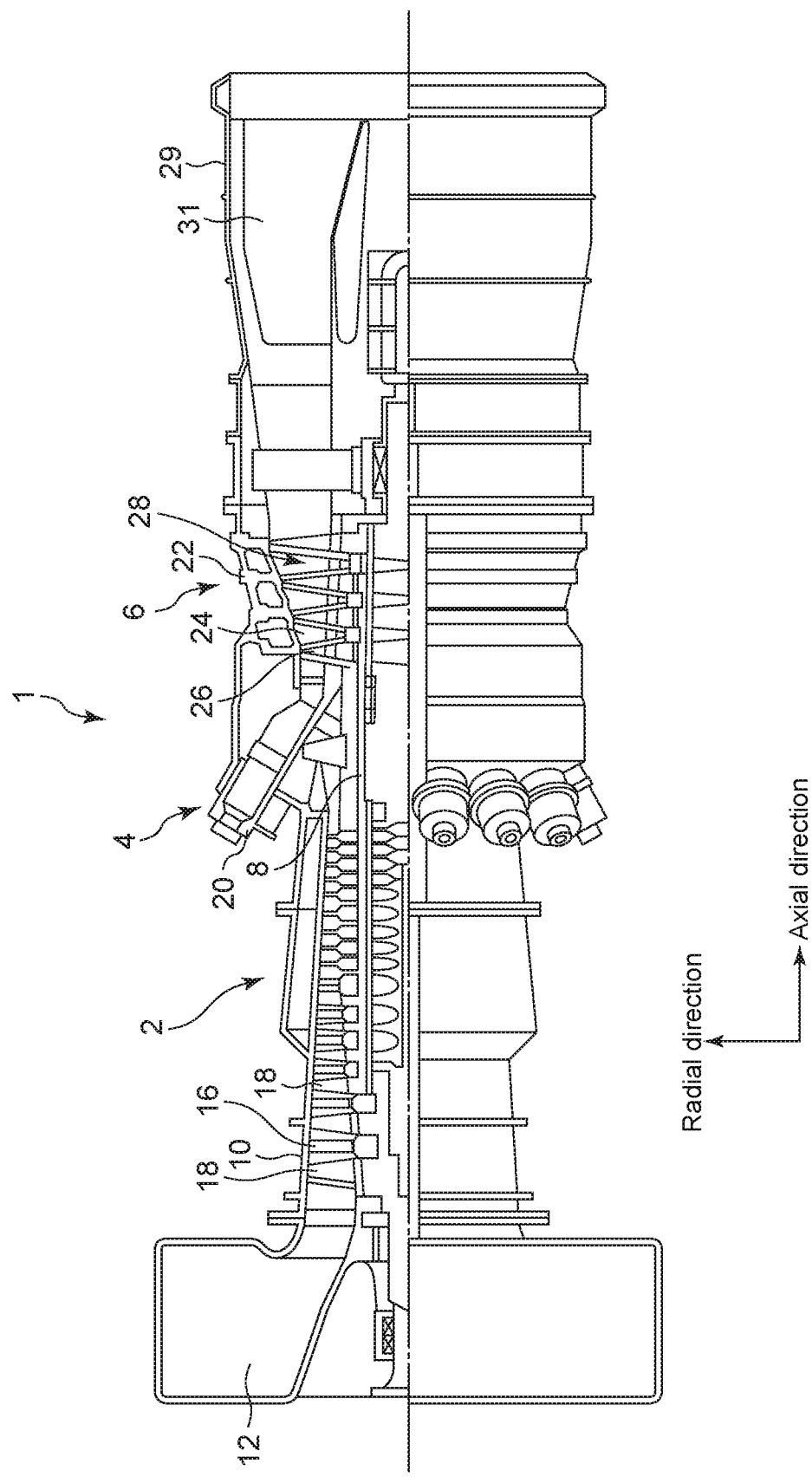
FIG. 1 is a schematic view of a gas turbine apparatus according to an embodiment.

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

(Configuration of Gas Turbine Apparatus)

FIG. 1 is a schematic view of a gas turbine apparatus according to an embodiment. As shown in FIG. 1, a gas turbine apparatus 1 includes a compressor 2 for generating compressed air, a combustor 4 for generating a combustion gas from the compressed air and fuel, and a turbine 6 configured to be rotary driven by the combustion gas. In the case of the gas turbine apparatus 1 for power generation, a generator (not shown) is connected to the turbine 6.

The compressor 2 includes a plurality of stator vanes 16 fixed to the side of a compressor casing 10 and a plurality of rotor blades 18 implanted on a rotor 8 so as to be arranged alternately with respect to the stator vanes 16. Intake air from an air inlet 12 is sent to the compressor 2, and passes through the plurality of stator vanes 16 and the plurality of rotor blades 18 to be compressed, turning into compressed air having a high temperature and a high pressure.

The combustor 4 is supported by a combustor casing 20. The compressed air from the compressor 2 is supplied to the combustor 4 via an interior space of the combustor casing 20, and fuel from a fuel port is also supplied to the combustor 4. In the combustor 4, the fuel and the compressed air are mixed and combusted to generate the combustion gas serving as a working fluid of the turbine 6. As shown in FIG. 1, a plurality of combustors 4 may be disposed along the circumferential direction in the casing 20, centering on the rotor 8.

The turbine 6 includes a combustion gas flow passage 28 formed in a turbine casing 22, and includes a plurality of stator vanes 24 and rotor blades 26 disposed in the combustion gas flow passage 28. Each of the stator vanes 24 is fixed to the side of the turbine casing 22. The plurality of stator vanes 24 arranged along the circumferential direction of the rotor 8 form stator vane rows. Moreover, each of the rotor blades 26 is implanted on the rotor 8. The plurality of rotor blades 26 arranged along the circumferential direction of the rotor 8 form rotor blade rows. The stator vane rows and the rotor blade rows are alternately arranged in the axial direction of the rotor 8.

In the turbine 6, the combustion gas flowing into the combustion gas flow passage 28 from the combustor 4 passes through the plurality of stator vanes 24 and the plurality of rotor blades 26, thereby rotary driving the rotor 8. Consequently, the generator connected to the rotor 8 is driven to generate power. The combustion gas (exhaust air) having driven the turbine 6 is discharged to the outside via an exhaust passage 31 formed at least partially by an exhaust chamber 29.

Figure 2:
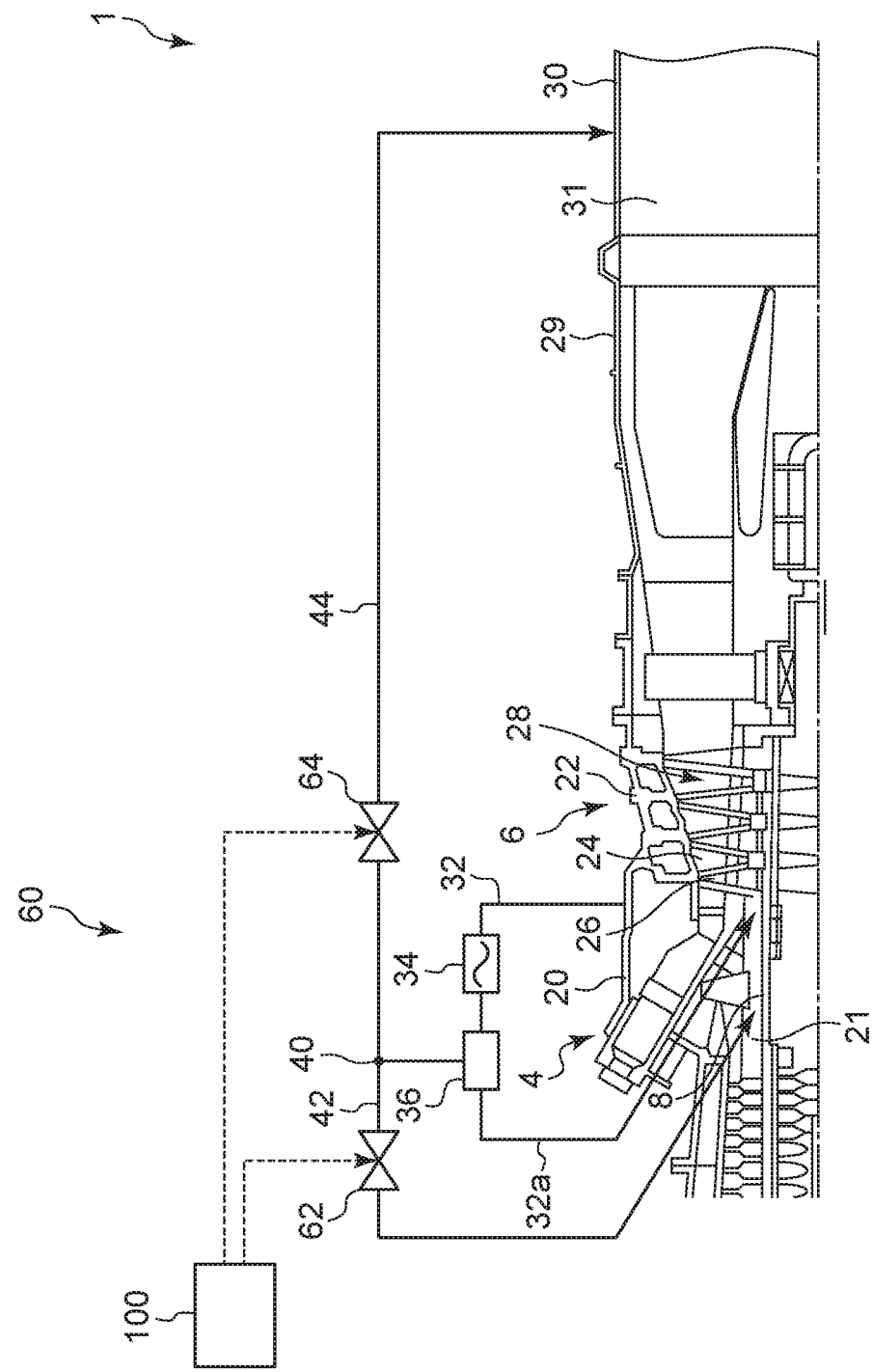
FIG. 2 is a schematic configuration view of the gas turbine apparatus according to an embodiment.
Figure 3:
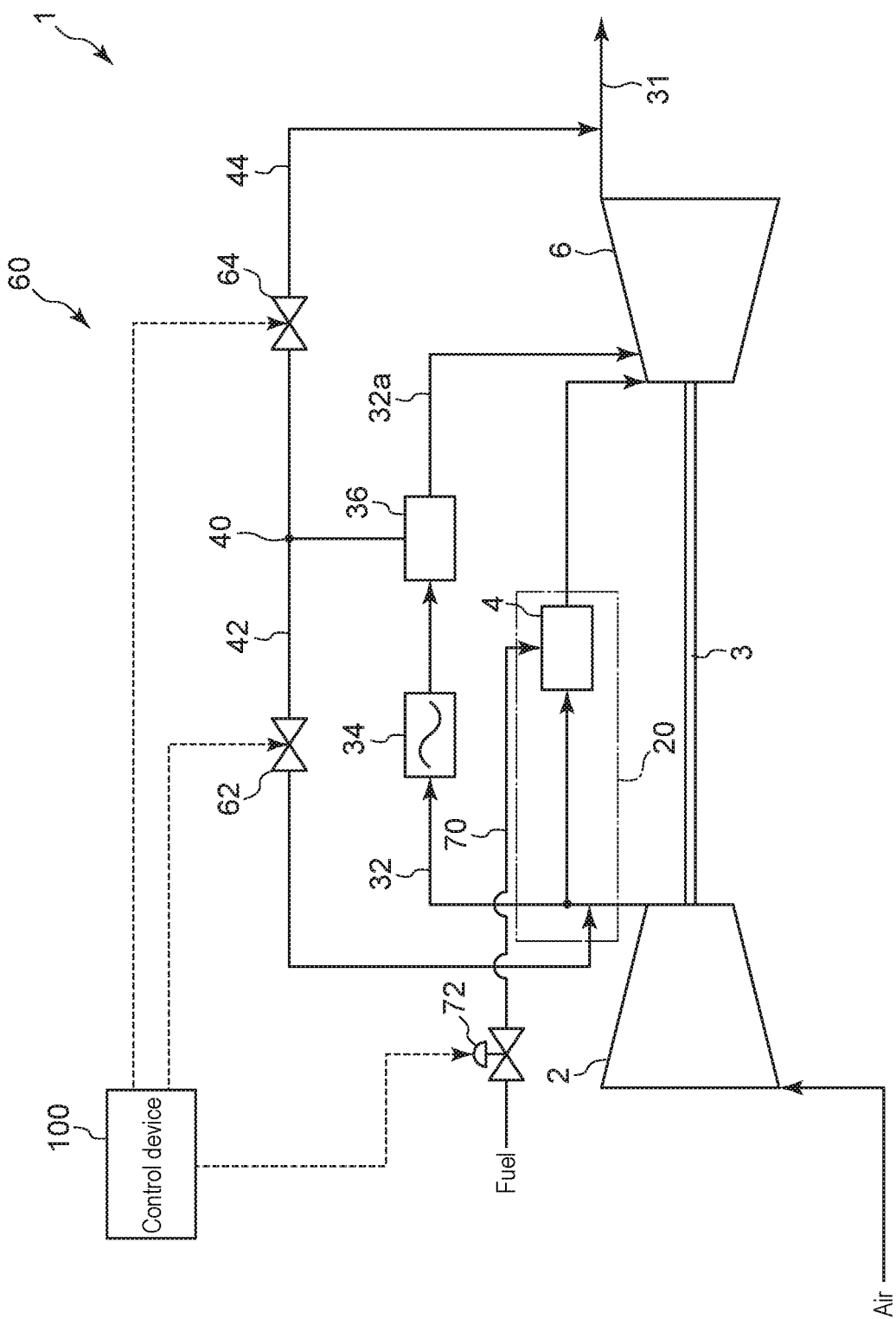
FIG. 3 is a schematic configuration view of the gas turbine apparatus according to an embodiment.

The gas turbine apparatus 1 according to some embodiments will be described more specifically, with reference to FIGS. 2 to 7. FIG. 2 is a schematic configuration view of the gas turbine apparatus according to an embodiment. Each of FIGS. 3 to 6 is a schematic configuration view of the gas turbine apparatus according to an embodiment. FIG. 3 is a view showing the gas turbine apparatus shown in FIG. 2 more schematically. FIG. 7 is a view showing the configuration of a filter part provided in the gas turbine apparatus according to an embodiment. Each of FIGS. 3 to 6 shows a rotor shaft 3 disposed between the compressor 2 and the turbine 6.

As shown in FIGS. 2 to 6, the gas turbine apparatus 1 includes an extraction line 32 and a cooling part 34. The extraction line 32 is configured to extract air (the compressed air from the compressor 2; a fluid) from the combustor casing 20. The cooling part 34 is disposed in the extraction line 32 and is configured to cool air flowing through the extraction line 32.

The extraction line 32 is connected to the combustor casing 20 in the upstream end part thereof. Moreover, a downstream part 32a of the extraction line 32 downstream of the cooling part 34 communicates with a cooling target part of the gas turbine apparatus 1. That is, the air cooled by the cooling part 34 is supplied to the cooling target part via the downstream part 32a of the extraction line 32, thereby cooling the cooling target part.

In some embodiments, the cooling target part may be the turbine 6, for example, a rotor part of the turbine 6 or the rotor blades 26. In the exemplary embodiment shown in FIG. 2, the air from the cooling part 34 is supplied to the rotor part of the turbine 6 via the extraction line 32 and is used to cool the rotor blades 26.

The cooling part 34 may be, for example, a heat exchanger configured to cool the air flowing through the extraction line 32, by heat exchange with a cooling medium, or may be a fan or a blower for convection-cooling the air in the extraction line 32.

As shown in FIGS. 2 to 6, the gas turbine apparatus 1 further includes a return line 42 connected to the extraction line 32 at a position downstream of the cooling part 34, and a bypass line 44 branching from the return line 42. In the exemplary embodiments shown in FIGS. 2 to 6, the return line 42 is connected to the extraction line 32 via a filter part 36 (to be described later) disposed downstream of the cooling part 34.

The return line 42 is configured to return the air from the cooling part 34 to the inside of the combustor casing 20. The air returned to the combustor casing 20 via the return line 42 merges into the air sent from the compressor 2 to the combustor casing 20, and is supplied to the combustor 4 to be consumed as the combustion air (combustion oxidizer) or extracted again via the extraction line 32.

The air returned to the combustor casing 20 via the return line 42 may be used to cool the combustor casing 20, the compressor 2, or the like. Thus, for example, the return line 42 may be formed by the combustor casing 20 and communicate with a passage 21 communicating with an air flow passage for the compressor 2, as shown in FIG. 2. That is, the air flowing into the passage 21 from the return line 42 may flow into a space, of the combustor casing 20, accommodating the combustor 4 after passing through a cascade in a rear stage of the compressor 2.

The bypass line 44 is configured to branch from the return line 42 at a branch position 40 on the return line 42 and to introduce the air from the cooling part 34 to the exhaust passage 31 by bypassing the turbine 6. The air introduced to the exhaust passage 31 merges into the combustion gas from the combustion gas flow passage 28 of the turbine 6 and is discharged to the outside of the system of the gas turbine apparatus 1 via the exhaust passage 31. As shown in FIG. 2, an exhaust duct 30 may be connected to the exhaust chamber 29. In this case, the exhaust passage 31 is formed by the exhaust chamber 29 and the exhaust duct 30. The downstream end of the bypass line 44 may be connected to the exhaust chamber 29 or the exhaust duct 30.

In the exemplary embodiments shown in FIGS. 2 to 6, the gas turbine apparatus 1 further includes the filter part 36 disposed in the extraction line 32 downstream of the cooling part 34. The filter part 36 is configured to collect foreign substances which are included in the air introduced to the extraction line 32 from the combustor casing 20.

FIG. 7 is a schematic view showing an example of the filter part 36 for the gas turbine apparatus 1 according to an embodiment. As shown in FIG. 7, the filter part 36 includes a filter 37 for removing foreign substances (such as dust) from the fluid, and a collection part 38 for collecting the foreign substances removed from the fluid, The return line 42 is connected to a foreign substance collection space 39 formed by the collection part 38.

The filter 37 has a structure that allows passage of the fluid but does not allow passage of the foreign substances to be removed, and may include, for example, a slit or a mesh.

The air (fluid) from the combustor casing 20 flows into the filter part 36 via the extraction line 32. When the air flowing in from the extraction line 32 passes through the filter 37, foreign substances 104 included in the air are removed by the filter 37. Clean air 102 having passed through the filter 37 to have the foreign substances 104 removed is introduced to the downstream part 32a of the extraction line 32. On the other hand, the foreign substances 104 removed by the filter 37 are collected in the foreign substance collection space 39 formed by the collection part 38, and are discharged from the filter part 36 via the return line 42, together with a part of the air sent to the filter part 36 via the extraction line 32.

That is, in the exemplary embodiments shown in FIGS. 2 to 6, the air (fluid) including the foreign substances flowing out of the foreign substance collection space 39 of the filter part 36 flows through the return line 42 and flows into the inside of the combustor casing 20, or bypasses the turbine 6 and flows into the exhaust passage 31 via the bypass line 44 branching from the return line 42.

Figure 6:
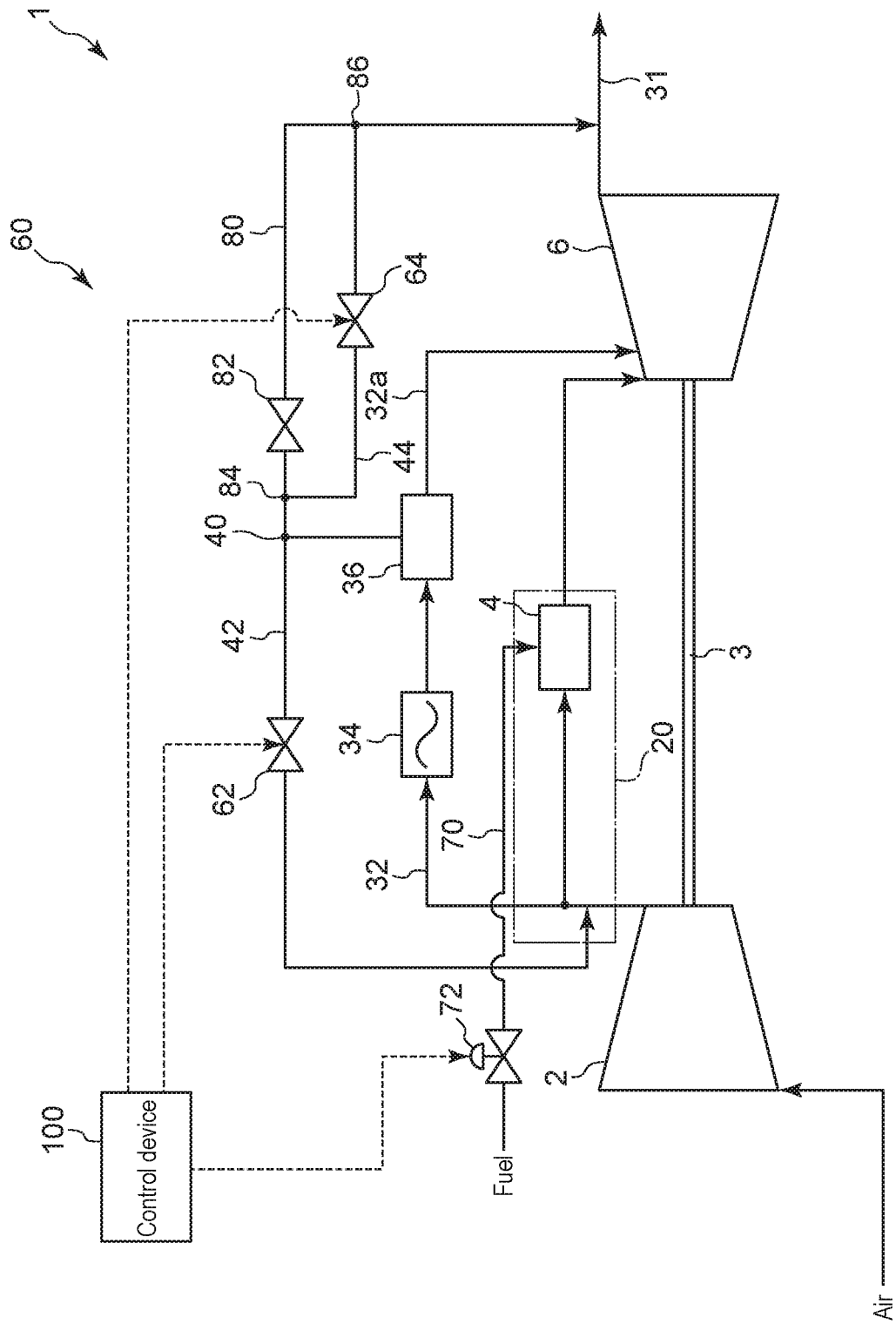
FIG. 6 is a schematic configuration view of the gas turbine apparatus according to an embodiment.
Figure 7:
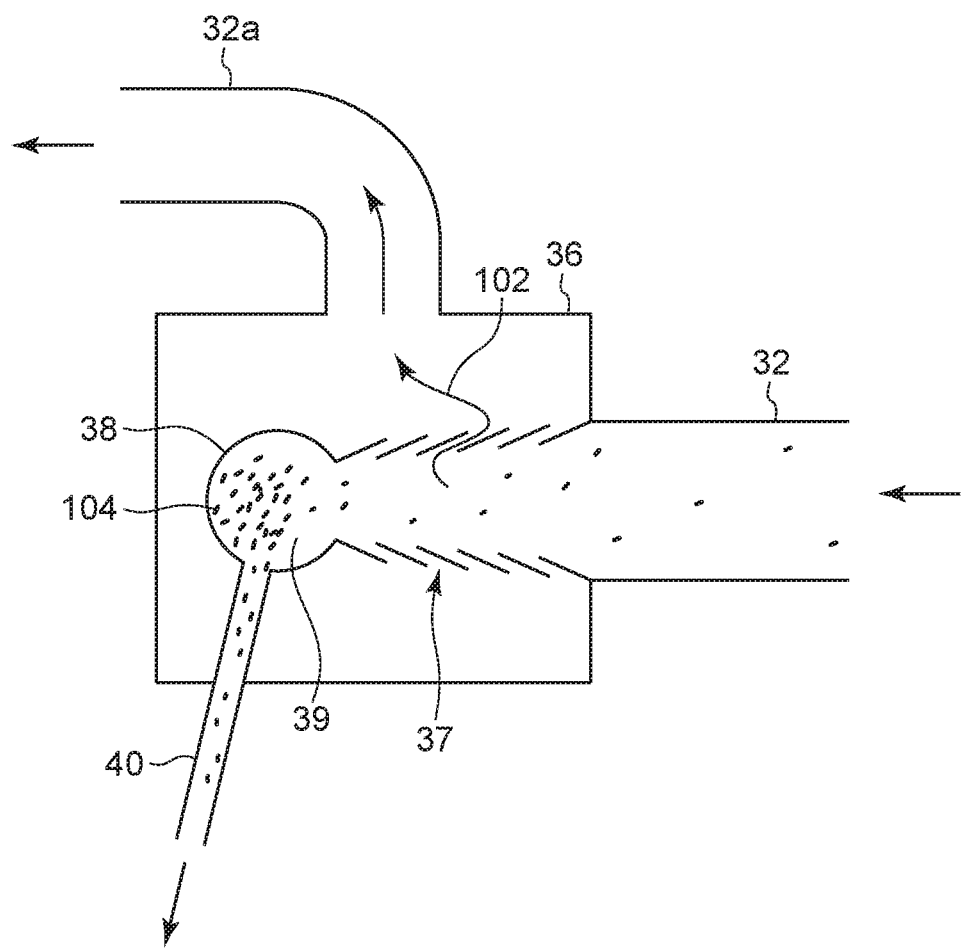
FIG. 7 is a view showing the configuration of a filter part provided in the gas turbine apparatus according to an embodiment.

In some embodiments, the gas turbine apparatus 1 further includes a discharge line 80 branching from the return line 42 or the bypass line 44 and used for introducing the fluid from the cooling part 34 to the exhaust passage 31 by bypassing the turbine 6, as shown in FIG. 6, for example. In the exemplary embodiment shown in FIG. 6, the discharge line 80 has an upstream end branching from a first point 84 on the bypass line 44 and connected to the first point 84, and a second point 86 positioned downstream of the first point 84 on the bypass line 44.

The discharge line 80 may be provided for a temporary purpose of discharging the air including the foreign substances from the filter part 36 by bypassing the turbine 6 at the time of a test operation, for example.

The diameter of a pipe forming the discharge line 80 may be smaller than that of a pipe forming the bypass line 44. That is, the diameter of the pipe forming the bypass line 44 may be larger than that of the pipe forming the discharge line 80. In a case in which the discharge line 80 is provided for the temporary use, noise, vibrations, and the like of the pipe do not matter too much. Thus, decreasing the diameter of the pipe, it is possible to reduce a material cost.

On the other hand, the bypass line 44 is regularly used on a specific operation condition, as will be described later. Thus, causing the diameter of the pipe forming the bypass line 44 to be larger than that of the pipe forming the discharge line 80, it is possible to relatively decrease a flow rate inside the bypass line 44. Thus, it is possible to reduce risks of the vibration, noise, and the like when the air (fluid) from the cooling part 34 flows toward the exhaust passage 31 via the bypass line 44.

Figure 5:
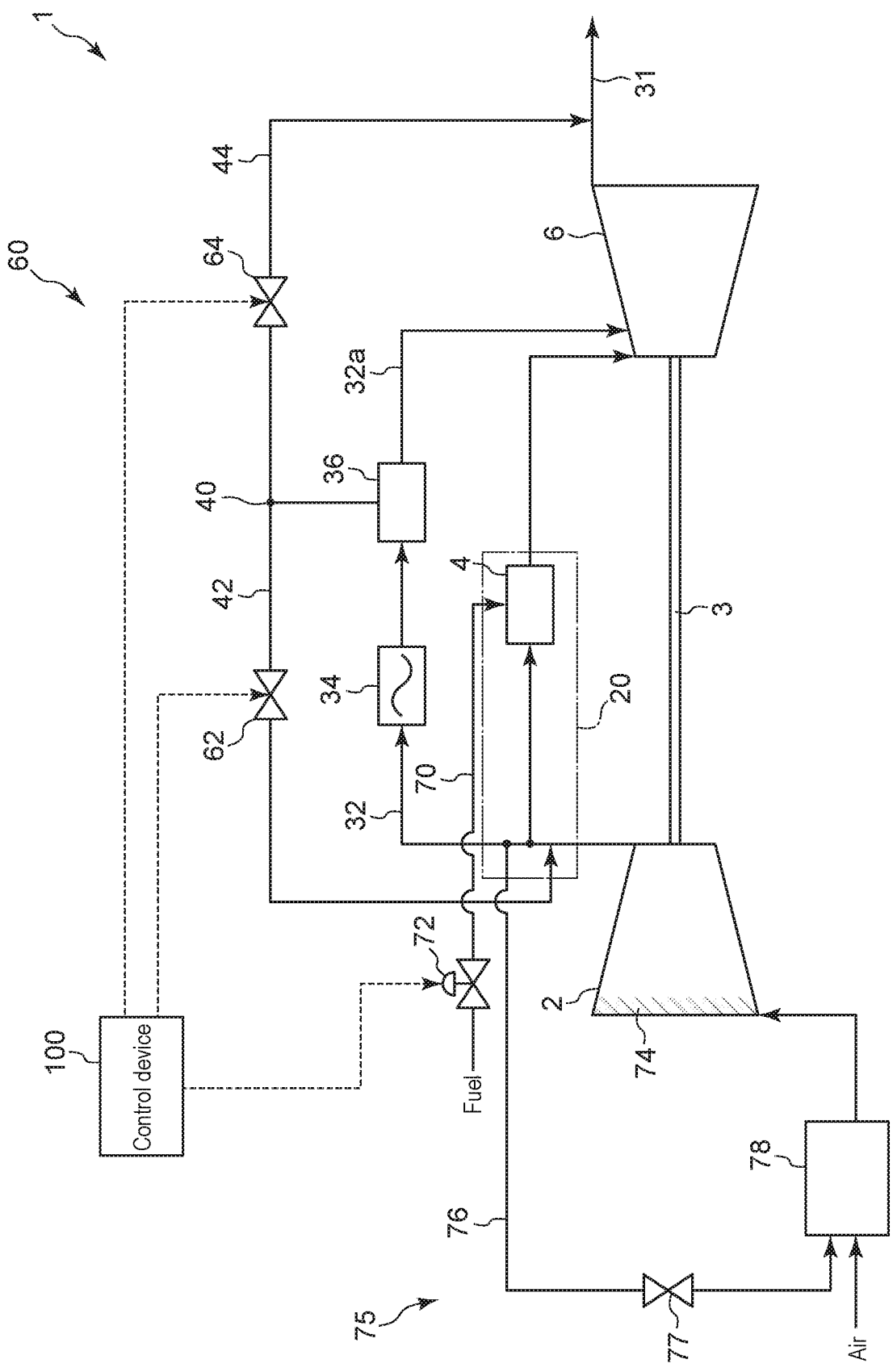
FIG. 5 is a schematic configuration view of the gas turbine apparatus according to an embodiment.

In some embodiments, an inlet guide vane 74 may be disposed in the compressor 2 for the gas turbine apparatus 1, as shown in FIG. 5, for example. The inlet guide vane 74 is disposed upstream of a first-stage cascade of the compressor 2. In the compressor 2 including the inlet guide vane 74, the amount of the air (fluid) flowing into the combustor 4 from the compressor 2 is changed by adjusting the opening degree of the inlet guide vane 74, making it possible to change the turbine inlet temperature of the combustion gas generated by the combustor 4.

Moreover, in some embodiments, the gas turbine apparatus 1 may include an anti-icing part 75 for preventing icing of an intake filter 78 positioned upstream of the compressor 2. The anti-icing part 75 includes a blower line 76 disposed between the combustor casing 20 and the intake filter 78, and a valve 77 disposed in the blower line 76. The anti-icing part 75 prevents icing of the intake filter 78 by blowing relatively high-temperature air (fluid) extracted from the combustor casing 20 to the intake filter 78 via the blower line 76 when an ambient temperature is low, for example. In this case, an intake temperature of the compressor 2 increases, as compared with a case without the anti-icing part 75. Thus, it is possible to reduce the amount (mass flow rate) of the fluid supplied from the compressor 2 to the combustor 4.

In some embodiments, the gas turbine apparatus 1 may include a control device 100 (control part) for controlling the operation of the gas turbine apparatus 1. The control device 100 may be configured to adjust a fuel supply amount to the combustor 4 based on a load applied from the outside (such as an upper control device), for example. The amount of the fuel supplied to the combustor 4 may be adjusted by adjusting the opening degree of a fuel valve 72 (see FIGS. 3 to 6) disposed in a fuel supply line 70 for supplying the fuel to the combustor 4.

The gas turbine apparatus 1 includes a communication state switching part 60 for controlling a communication state between the extraction line 32 and the combustor casing 20 via the return line 42, and a communication state between the extraction line 32 and the exhaust passage 31 via the bypass line 44.

In some embodiments, the communication state switching part 60 includes at least one valve and a control part for controlling opening and closing of the valve. The valve can switch at least one of the communication state between the extraction line 32 and the combustor casing 20 via the return line 42, and the communication state between the extraction line 32 and the exhaust passage 31 via the bypass line 44. The above-described control device 100 may function as the control part.

In the exemplary embodiments shown in FIGS. 2, 3, 5, and 6, the communication state switching part 60 includes a return valve 62 disposed downstream of the branch position 40 of the bypass line 44 in the return line 42, a bypass valve 64 disposed in the bypass line 44, and the control device 100 (control part).

The return valve 62 is configured to be able to switch the communication state between the extraction line 32 and the combustor casing 20 via the return line 42. That is, the extraction line 32 and the combustor casing 20 communicate with each other via the return line 42, when the return valve 62 is opened. Moreover, the communication between the extraction line 32 and the combustor casing 20 via the return line 42 is shut off, when the return valve 62 is closed.

The bypass valve 64 is configured to be able to switch the communication state between the extraction line 32 and the exhaust passage 31 via the bypass line 44. That is, the extraction line 32 and the exhaust passage 31 communicate with each other via the bypass line 44, when the bypass valve 64 is opened. Moreover, the communication between the extraction line 32 and the exhaust passage 31 via the bypass line 44 is shut off, when the bypass valve 64 is closed.

Figure 4:
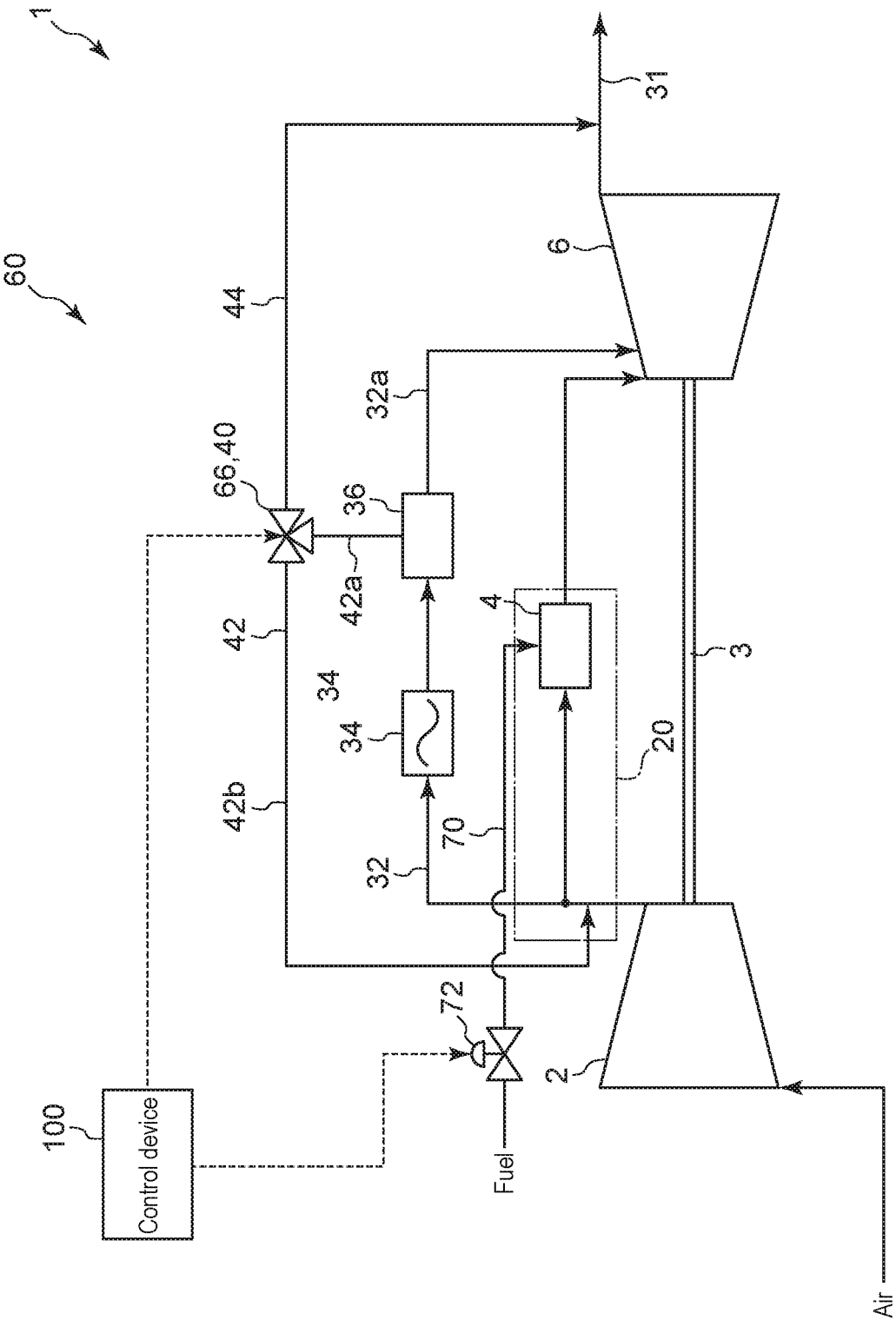
FIG. 4 is a schematic configuration view of the gas turbine apparatus according to an embodiment.

In the exemplary embodiment shown in FIG. 4, a three-way valve 66 disposed at the branch position 40 of the bypass line 44 in the return line 42, and the control device 100 (control part) are provided. The three-way valve 66 is configured to be able to switch the communication state between the extraction line 32 and the combustor casing 20 via the return line 42, and the communication state between the extraction line 32 and the exhaust passage 31 via the bypass line 44. That is, the three-way valve 66 can switch a flow-out destination of the air (fluid) from the cooling part 34, which has flowed in from a portion 42a of the return line 42 upstream of the branch position 40, between the bypass line 44 and a portion 42b of the return line 42 downstream of the branch position 40.

The communication state switching part 60 is configured to, during an operation of the gas turbine apparatus 1 at the first load (for example, a rated load), cause the extraction line 32 and the combustor casing 20 to communicate with each other via the return line 42 and to shut off the communication between the extraction line 32 and the exhaust passage 31 via the bypass line 44, and is configured to, during an operation of the gas turbine apparatus 1 at the second load (for example, a load not more than 60% of the rated load) which is lower than the first load, shut off the communication between the extraction line 32 and the combustor casing 20 via the return line 42 and to cause the extraction line 32 and the exhaust passage 31 to communicate with each other via the bypass line 44.

(Operation Method for Gas Turbine Apparatus)

An operation method for the gas turbine apparatus 1 by the communication state switching part 60 will be described with reference to FIGS. 8 to 13. Each of FIGS. 8 to 13 is a chart showing changes in loads, and respective opened and closed states of the return valve 62 and the bypass valve 64 during the operation of the gas turbine apparatus 1 according to an embodiment.

Hereinafter, the operation method for the gas turbine apparatus 1 by the communication state switching part 60 including the above-described return valve 62 and bypass valve 64 (see FIG. 2, 3, 5, or 6) as a means for switching the communication state between the extraction line 32 and the combustor casing 20 via the return line 42, and the communication state between the extraction line 32 and the exhaust passage 31 via the bypass line 44 will be described. However, the same description is also applicable to the case of the communication state switching part 60 including the three-way valve 66 in place of the return valve 62 and the bypass valve 64 (see FIG. 4). Moreover, the operation method to be described below is applicable not only to an operation by automatic control by the communication state switching part 60 including the control device 100 (control part), but also to a manual operation.

Figure 8:
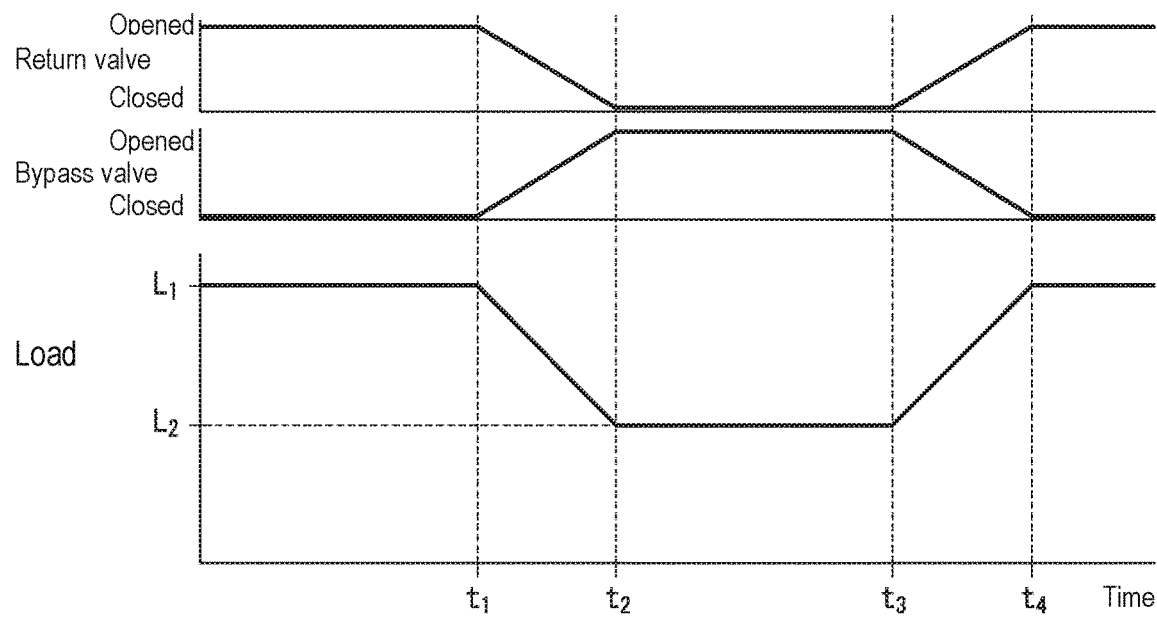
FIG. 8 is a chart showing changes in loads and respective opened and closed states of valves during an operation of the gas turbine apparatus according to an embodiment.
Figure 9:
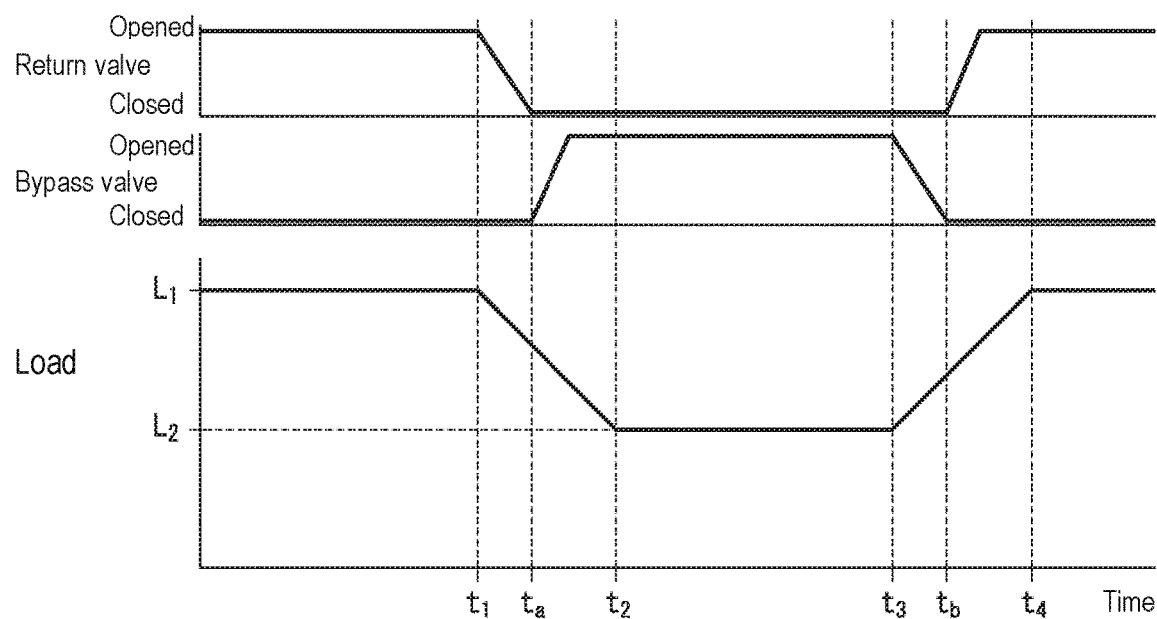
FIG. 9 is a chart showing changes in the loads and respective opened and closed states of the valves during the operation of the gas turbine apparatus according to an embodiment.

As shown in FIGS. 8 and 9, the control device 100 brings the return valve 62 to the opened state and brings the bypass valve 64 to the closed state during the operation of the gas turbine apparatus 1 at a first load L1 (until time t1 in FIG. 8, 9). Thus, a state is obtained in which the extraction line 32 and the combustor casing 20 communicate with each other via the return line 42, and the communication between the extraction line 32 and the exhaust passage 31 via the bypass line 44 is shut off. Therefore, during the operation at the first load L1, the fluid (in some embodiments, the air including the foreign substances from the filter part 36) flowing into the return line 42 from the extraction line 32 downstream of the cooling part 34 is returned to the combustor casing 20 via the return line 42, and then supplied to the combustor 4 to be consumed as the combustion air (combustion oxidizer) or extracted again via the extraction line 32.

During the operation of the gas turbine apparatus 1 at the first load L1, when the operation is switched to the operation at a second load L2 which is lower than the first load L1 (from the time t1 to time t2 in FIG. 8, 9) upon receiving a command of the operation at the second load L2, the control device 100 closes the return valve 62 and opens the bypass valve 64. Thus, during the operation at the second load L2 (from the time t2 to time t3 in FIG. 8, 9), a state is obtained in which the communication between the extraction line 32 and the combustor casing 20 via the return line 42 is shut off, and the extraction line 32 and the exhaust passage 31 communicate with each other via the bypass line 44.

Therefore, during the operation at the second load L2, the fluid (in some embodiments, the air including the foreign substances from the filter part 36) flowing into the return line 42 from the extraction line 32 downstream of the cooling part 34 is introduced to the exhaust passage 31 by bypassing the combustor 4 and the turbine 6 via the bypass line 44. That is, during the operation at the second load L2, the fluid (air) flowing into the return line 42 from the extraction line 32 downstream of the cooling part 34 is not returned to the combustor casing 20 via the return line 42. Thus, the amount of the combustion oxidizer (combustion air) supplied to the combustor 4 is reduced, as compared with during the operation at the first load L1.

Moreover, during the operation of the gas turbine apparatus 1 at the second load L2, when the operation is switched to the operation at the first load L1 which is higher than the second load L2 (from the time t3 to time t4 in FIG. 8, 9) upon receiving a command of the operation at the first load L1, the control device 100 opens the return valve 62 and closes the bypass valve 64. Thus, after the time t4 in FIG. 8, 9. the state is obtained in which the extraction line 32 and the combustor casing 20 communicate with each other via the return line 42, and the communication between the extraction line 32 and the exhaust passage 31 via the bypass line 44 is shut off, as until the time t1.

Thus, in the above-described embodiments, the air (fluid) from the cooling part 34 is returned to the combustor casing 20 via the return line 42 in the operation at the first load L1 of the relatively high load, and is discharged by bypassing the combustor 4 and the turbine 6 via the bypass line 44 in the operation at the second load L2 of the relatively low load.

Thus, it is possible to effectively reduce the amount of the air (fluid) supplied to the combustor 4 in the operation at the second load, as compared with the operation at the first load. Reducing the amount of the air, the fuel amount at the same load increases, making it possible to increase the turbine inlet temperature. Thus, it is possible to reduce the CO emission by increasing the turbine inlet temperature in the low-load operation.

Moreover, in the above-described embodiments, since the bypass line 44 is disposed so as to branch from the return line 42, it is possible to install the bypass line 44 relatively easily by a method for connecting the pipe forming the bypass line 44 to the pipe forming the return line 42, for example. Thus, it is possible to suppress an increase in manufacturing cost of the gas turbine apparatus 1.

Therefore, according to the above-described embodiments, it is possible to effectively suppress the increase in CO emission during the operation at the relatively low load, while suppressing the increase in cost.

In FIG. 8, the start and end of opening operations or closing operations of the return valve 62 and the bypass valve 64 match the start (time t1 or t3) and end (time t2 or t4) of changes in loads of the gas turbine apparatus 1, respectively. However, the present invention is not limited to such a mode, and the start and end of the opening operations or closing operations of the return valve 62 and the bypass valve 64, and the start (time t1 or t3) and the end (time t2 or t4) of the changes in loads of the gas turbine apparatus 1 may be mismatched to a certain degree. For example, the respective opening operations or closing operations of the return valve 62 and the bypass valve 64 may be started or ended in the middle of the change in load of the gas turbine apparatus between the first load L1 and the second load L2 (for example, between the times t1 and t2), or before the start (for example, before the time t1) or after the end (for example, after the time t2) of the change in load.

In some embodiments, for example, as shown in FIG. 9, the communication state switching part 60 is configured to, at the time of a transition from the operation at the first load L1 to the operation at the second load L2 (from the time t1 to the time t2 in FIG. 9), shut off the communication between the extraction line 32 and the combustor casing 20 via the return line 42, and then to cause the extraction line 32 and the exhaust passage 31 to communicate with each other via the bypass line 44. That is, at the time of the transition from the operation at the first load L1 to the operation at the second load L2, the control device 100 closes the return valve 62 (a time to in FIG. 9), and then opens the bypass valve 46.

A pressure of the exhaust passage 31 positioned on an outlet side of the turbine 6 is low, relative to the combustor casing 20 supplied with a high-pressure fluid. Thus, in the state where the return line 42 and the bypass line 44 communicate with each other, a flow from the combustor casing 20 to the exhaust passage 31 via the return line 42 and the bypass line 44 occurs, decreasing efficiency of the gas turbine apparatus 1 in this case. In this regard, according to the above-described embodiments, at the time of the transition from the operation at the first load L1 of the relatively high load to the operation at the second load L2 of the relatively low load, the communication between the extraction line 32 and the combustor casing 20 via the return line 42 is shut off, and then the extraction line 32 and the exhaust passage 31 are caused to communicate with each other via the bypass line 44. Thus, the return line 42 and the bypass line 44 do not communicate with each other, hardly causing the flow from the combustor casing 20 to the exhaust passage 31 via the return line 42 and the bypass line 44. Therefore, according to the above-described embodiments, it is possible to effectively suppress the increase in CO emission during the operation at the relatively low load, while suppressing the decrease in efficiency of the gas turbine apparatus 1 as well as suppressing the increase in cost.

In some embodiments, during the operation at the second load L2, the communication state between the extraction line 32 and the combustor casing 20 via the return line 42, and the communication state between the extraction line 32 and the exhaust passage 31 via the bypass line 44 may be controlled as described above, and the opening degree of the inlet guide vane 74 (see FIG. 5) of the compressor 2 may be decreased, as compared with during the operation at the first load L1.

Thus adjusting the opening degree of the inlet guide vane 74, the amount of the air (fluid) flowing into the combustor 4 from the compressor 2 is decreased, making it possible to increase the turbine inlet temperature of the combustion gas generated by the combustor 4, during the operation at the second load L2. Therefore, according to the above-described embodiments, it is possible to suppress the increase in CO emission during the operation at the relatively low load more effectively.

Moreover, in some embodiments, during the operation at the second load L2, the communication state between the extraction line 32 and the combustor casing 20 via the return line 42, and the communication state between the extraction line 32 and the exhaust passage 31 via the bypass line 44 may be controlled as described above, and the amount of the air (fluid) blown to the intake filter 78 by the anti-icing part 75 may be increased, as compared with during the operation at the first load L1. Note that the amount of the air blown to the intake filter 78 by the anti-icing part 75 during the operation at the first load L1 is not less than zero (that is, the amount of the air blown to the intake filter 78 by the anti-icing part 75 during the operation at the first load L1 may be zero).

Thus adjusting the amount of the fluid blown to the intake filter 78 by the anti-icing part 75, it is possible to increase the intake temperature of the compressor 2 and to decrease the amount (mass flow rate) of the fluid supplied from the compressor 2 to the combustor 4 during the operation at the second load L2. Therefore, it is possible to increase the turbine inlet temperature of the combustion gas generated by the combustor 4. Therefore, according to the above-described embodiments, it is possible to suppress the increase in CO emission during the operation at the relatively low load more effectively.

Next, control in some cases, where the valve (for example, the return valve 62 or the bypass valve 64) composing the communication state switching part 60 cannot normally be opened and closed due to some abnormality occurring in the valve, will be described.

Figure 10:
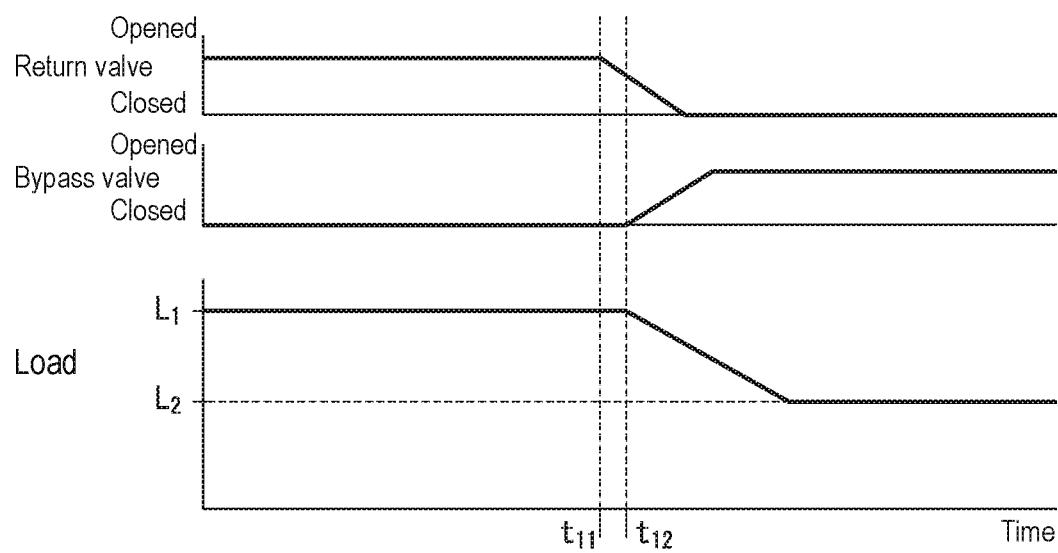
FIG. 10 is a chart showing changes in the loads and respective opened and closed states of the valves during the operation of the gas turbine apparatus according to an embodiment.

In the example shown in FIG. 10, at time t11 during the operation of the gas turbine apparatus 1 at the first load L1, an abnormality occurs such that it is impossible to cause the extraction line 32 and the combustor casing 20 to communicate with each other via the return line 42. More specifically, at the time t11, an abnormality occurs in which the return valve 62 to be in the opened state during the operation at the first load L1 is closed due to some trouble.

The control device 100 according to some embodiments causes the extraction line 32 and the exhaust passage 31 to communicate with each other via the bypass line 44, and causes the gas turbine apparatus 1 to transit to the operation at the second load L2, if the above-described abnormality occurs. More specifically, at time (time t12 in FIG. 10) after the time t11 when the above-described trouble occurs, the bypass valve 64 disposed in the bypass line 44 is opened, and the load of the gas turbine apparatus 1 is decreased from the first load L1 to the second load L2 by adjusting the opening degree of the fuel valve 72.

If a part of the air (fluid) from the cooling part 34 is returned to the combustor casing 20 via the return line 42, a cooling effect of the combustor casing 20 by the fluid is obtained. However, as described above, during the operation at the first load L1 of the relatively high load, if the abnormality occurs such that it is impossible to cause the extraction line 32 and the combustor casing 20 to communicate with each other via the return line 42, the cooling effect of the combustor casing 20 by the fluid from the return line 42 is decreased. If the high-load operation is continued in this state, the temperatures of the combustor casing 20 and the like may increase excessively.

In this regard, according to the above-described embodiments, the extraction line 32 and the exhaust passage 31 are caused to communicate with each other via the bypass line 44, and the transition to the operation at the second load L2 of the lower load is made, if the above-described abnormality occurs. Thus, it is possible to suppress the increase in temperatures of the combustor casing 20 and the like.

Moreover, in a case in which the return line 42 is connected to the foreign substance collection space 39 of the filter part 36 disposed in the extraction line 32, it may be impossible to discharge the foreign substances collected in the filter part 36 from the filter part 36, and to appropriately supply the fluid cooled by the cooling part 34 to the cooling target part of the turbine 6, if a state is held in which both of the communication between the extraction line 32 and the combustor casing 20 via the return line 42, and the communication between the extraction line 32 and the exhaust passage 31 via the bypass line 44 are shut off.

In this regard, according to the above-described embodiments, the extraction line 32 and the exhaust passage 31 are caused to communicate with each other via the bypass line 44, if the above-described abnormality occurs. Thus, it is possible to appropriately discharge the foreign substances collected in the filter part 36 from the filter part 36. Thus, it is possible to appropriately supply the fluid cooled by the cooling part 34 to the cooling target part of the turbine 6, even at occurrence of the above-described abnormality.

Figure 11:
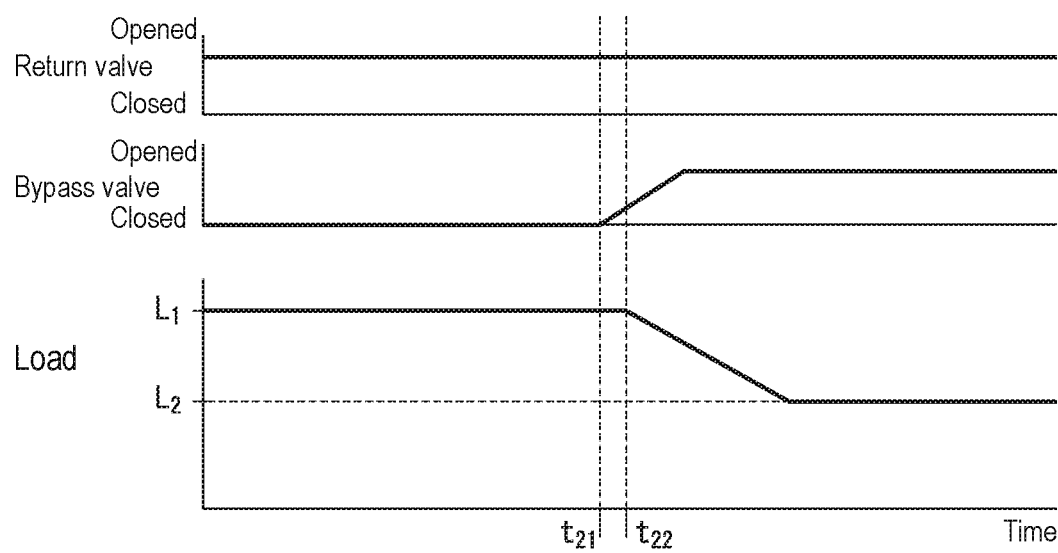
FIG. 11 is a chart showing changes in the loads and respective opened and closed states of the valves during the operation of the gas turbine apparatus according to an embodiment.

In the example shown in FIG. 11, at time t21 during the operation of the gas turbine apparatus 1 at the first load L1, an abnormality occurs such that it is impossible to shut off the communication between the extraction line 32 and the exhaust passage 31 via the bypass line 44. More specifically, at the time t21, an abnormality occurs in which the bypass valve 64 to be in the closed state during the operation at the first load L1 is opened due to some trouble.

The control device 100 according to some embodiments causes the gas turbine apparatus 1 to transit to the operation at the second load L2, if the above-described abnormality occurs. More specifically, at time (time t22 in FIG. 11) after the time t21 when the above-described trouble occurs, the load of the gas turbine apparatus 1 is decreased from the first load L1 to the second load L2 by adjusting the opening degree of the fuel valve 72.

During the operation at the first load L1 of the relatively high load, if the abnormality occurs such that it is impossible to shut off the communication between the extraction line 32 and the exhaust passage 31 via the bypass line 44, the state is obtained in which the return line 42 and the bypass line 44 communicate with each other, causing a flow (backflow) from the combustor casing 20 to the exhaust passage 31 via the return line 42 and the bypass line 44. Thus, the flow of the air (fluid) from the cooling part 34 to the combustor casing 20 via the return line 42 is reduced, decreasing the cooling effect of the combustor casing 20 by the fluid. If the high-load operation is continued in this state, the temperatures of the combustor casing 20 and the like may increase excessively.

In this regard, according to the above-described embodiments, the gas turbine apparatus 1 is caused to transit to the operation at the second load L2 of the lower load, if the above-described abnormality occurs. Thus, it is possible to suppress the excessive increase in temperatures of the combustor casing 20 and the like.

In some embodiments, the control device 100 may shut off the communication between the extraction line 32 and the combustor casing 20 via the return line 42, and may cause the gas turbine apparatus 1 to transit to the operation at the second load L2, if the above-described abnormality occurs. More specifically, at time (the time t22 in FIG. 11) after the time t21 when the above-described trouble occurs, the return valve 62 disposed in the return line 42 may be closed, and the load of the gas turbine apparatus 1 may be decreased from the first load L1 to the second load L2 by adjusting the opening degree of the fuel valve 72.

The return line 42 and the bypass line 44 are not caused to communicate with each other, hardly causing the flow from the combustor casing 20 to the exhaust passage 31 via the return line 42 and the bypass line 44. Thus, it is possible to suppress the decrease in amount of the air (fluid) supplied to the combustor casing 20, and to suppress the decrease in cooling effect of the combustor casing 20 by the fluid. Thus, it is possible to suppress the excessive increase in temperatures of the combustor casing 20 and the like more effectively, if the above-described abnormality occurs.

Figure 12:
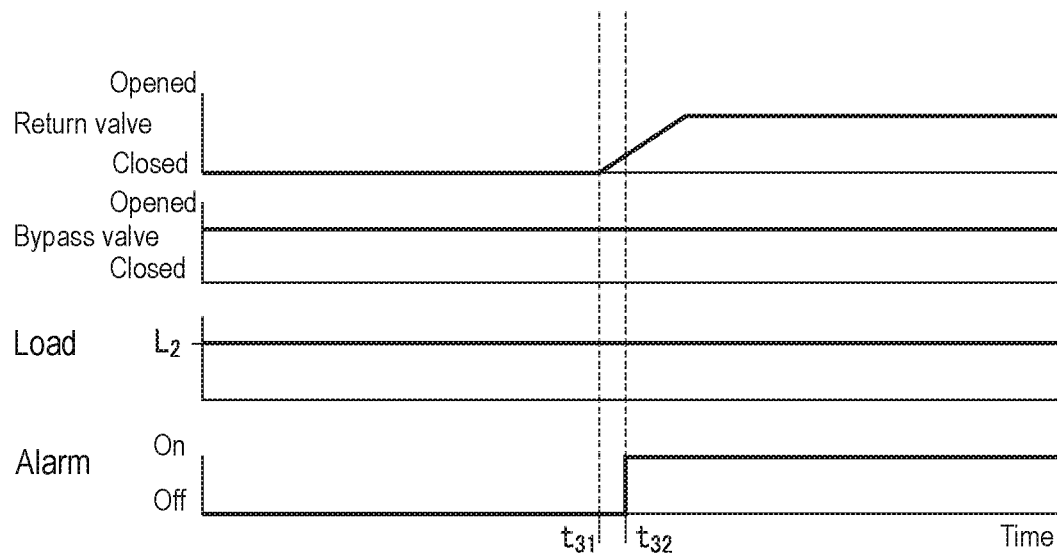
FIG. 12 is a chart showing changes in the load and the respective opened and closed states of the valves during the operation of the gas turbine apparatus according to an embodiment.

In the example shown in FIG. 12, at time t31 during the operation of the gas turbine apparatus 1 at the second load L2, an abnormality occurs such that it is impossible to shut off the communication between the extraction line 32 and the combustor casing 20 via the return line 42. More specifically, at the time t31, an abnormality occurs in which the return valve 62 to be in the closed state during the operation at the second load L2 is opened due to some trouble.

The control device 100 according to some embodiments outputs a warning signal (alarm) at time (time t32 in FIG. 12) after the time t31 when the above-described trouble occurs, if the above-described abnormality occurs. The warning signal may be sent to devices such as a display and a loudspeaker, and may be output in a form to be perceived visually or auditorily by these devices, for example.

During the operation at the second load L2 of the relatively low load, if the abnormality occurs such that it is impossible to shut off the communication between the extraction line 32 and the combustor casing 20 via the return line 42, the state is obtained in which the return line 42 and the bypass line 44 communicate with each other, causing the flow (backflow) from the combustor casing 20 to the exhaust passage 31 via the return line 42 and the bypass line 44. Thus, the flow of the fluid from the cooling part 34 to the combustor casing 20 via the return line 42 is reduced, decreasing the cooling effect of the combustor casing 20 by the fluid. Switching to the operation at the first load L1 of the higher load in this state, the temperatures of the combustor casing 20 and the like may increase excessively.

In this regard, in the above-described embodiments, the warning signal is output if the above-described abnormality occurs. Thus, an operator or the like can perceive occurrence of the abnormality. Thus, it is possible to obviate the excessive increase in temperatures of the combustor casing 20 and the like.

Figure 13:
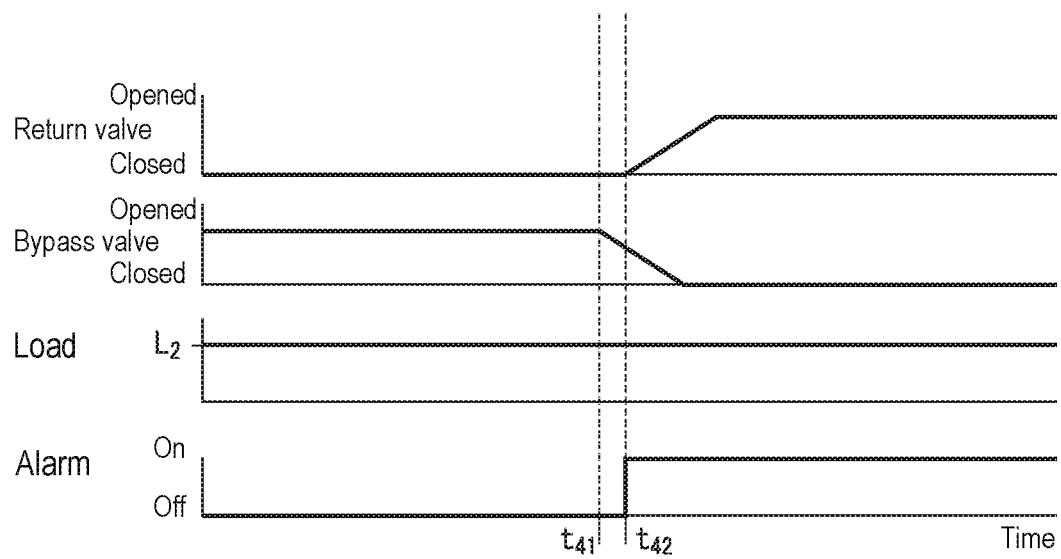
FIG. 13 is a chart showing changes in the load and the respective opened and closed states of the valves during the operation of the gas turbine apparatus according to an embodiment.

In the example shown in FIG. 13, at time t41 during the operation of the gas turbine apparatus 1 at the second load L2, an abnormality occurs such that it is impossible to cause the extraction line 32 and the exhaust passage 31 to communicate with each other via the bypass line 44. More specifically, at the time t41, an abnormality occurs in which the bypass valve 64 to be in the opened state during the operation at the second load L2 is closed due to some trouble.

The control device 100 according to some embodiments causes the extraction line 32 and the combustor casing 20 to communicate with each other via the return line 42, and outputs the warning signal, if the above-described abnormality occurs. More specifically, at time (time t42 in FIG. 13) after the time t41 when the above-described trouble occurs, the return valve 62 disposed in the return line 42 is opened, and the warning signal (alarm) is sent to the devices such as the display and the loudspeaker, for example.

In a case in which, during the operation at the second load L2 of the relatively low load, the abnormality occurs such that it is impossible to cause the extraction line 32 and the exhaust passage 31 to communicate with each other via the bypass line 44, it may be impossible to appropriately supply the fluid cooled by the cooling part 34 to the cooling target part, if the state is held in which the communication between the extraction line 32 and the combustor casing 20 via the return line 42 is shut off. For example, in the case in which the return line 42 is connected to the foreign substance collection space 39 of the filter part 36 disposed in the extraction line 32, it may be impossible to discharge the foreign substances collected in the filter part 36 from the filter part 36, and to appropriately supply the fluid cooled by the cooling part 34 to the cooling target part of the turbine 6, if the above-described abnormality occurs. Moreover, switching to the operation at the first load L1 of the higher load in this state, the temperatures of the combustor casing 20 and the like may increase excessively.

In this regard, according to the above-described embodiments, the extraction line 32 and the combustor casing 20 are caused to communicate with each other via the return line 42, and the warning signal is output, if the above-described abnormality occurs. Thus, it is possible to appropriately maintain the supply of the fluid from the cooling part 34 to the combustor casing 20 via the return line 42, and to obviate the excessive increase in temperatures of the combustor casing 20 and the like.

(Manufacturing Method for Gas Turbine Apparatus)

Hereinafter, a manufacturing method for the gas turbine apparatus 1 having the above configuration will be described.

In some embodiments, the above-described gas turbine apparatus 1 (for example, the gas turbine apparatus 1 shown in each of FIGS. 2 to 6) is manufactured by additionally installing the bypass line 44 to the gas turbine apparatus before the bypass line 44 is installed. More specifically, in the gas turbine apparatus including the return line 42, the upstream end of a bypass pipe (pipe) is connected to the return line 42 or another line communicating with the return line 42, forming the bypass line 44 by the bypass pipe.

In the case of the gas turbine apparatus 1 shown in each of FIGS. 2 to 5, the upstream end of the bypass pipe is connected to a return pipe forming the return line 42. Moreover, the downstream end of the bypass pipe is connected to a member forming the exhaust passage 31 (for example, the exhaust chamber 29 or the exhaust duct 30 for the turbine 6), or another line connected to the exhaust passage 31. Thus, the bypass line 44 is formed by the bypass pipe. A position on the return line 42 connected to the upstream end of the bypass pipe is the branch position 40 of the bypass line 44 from the return line 42.

In the case of the gas turbine apparatus 1 shown in FIG. 6, the gas turbine apparatus before the bypass line 44 is installed is provided with a discharge pipe forming the discharge line 80 branching from the return line 42. The discharge pipe is connected to the member forming the exhaust passage 31 or the another line connected to the exhaust passage 31. Then, the upstream end of the bypass pipe is connected to the discharge pipe. Moreover, the downstream end of the bypass pipe is connected to the discharge pipe, or the member forming the exhaust passage 31 or the another line connected to the exhaust passage 31. In this case, the bypass line 44 is formed by parts, of the bypass pipe and discharge pipe, upstream of the first point 84 (see FIG. 6) which is the connection position between the bypass pipe and the discharge pipe.

Since the upstream end of the bypass pipe is thus connected to the return line 42 or the another line communicating with the return line 42 to form the bypass line 44 by the bypass pipe, it is possible to install the bypass line relatively easily, as compared with a case in which the upstream end of the bypass pipe is directly connected to the combustor casing 20, for example. Therefore, it is possible to effectively reduce the manufacturing cost of the gas turbine apparatus.

Moreover, as in the gas turbine apparatus 1 shown in FIG. 6, in a case in which the bypass line 44 is formed by connecting the bypass pipe to the discharge pipe for the gas turbine apparatus originally including the discharge line 80, it is possible to use a space in the vicinity of the discharge pipe forming the discharge line as an installation space for the bypass pipe, making it possible to install the bypass line relatively easily. Therefore, it is possible to reduce the manufacturing cost of the gas turbine apparatus more effectively.

The contents described in the above embodiments would be understood as follows, for instance.

(1) A gas turbine apparatus (1) according to at least one embodiment of the present invention includes a turbine (6) configured to be driven by a combustion gas from a combustor (4), an exhaust passage (31) configured to allow exhaust air from the turbine to flow, an extraction line (32) configured to extract a fluid from a combustor casing (20), a cooling part (34) disposed in the extraction line and configured to cool the fluid, a return line (42) for returning the fluid from the cooling part to an inside of the combustor casing, the return line being connected to the extraction line downstream of the cooling part, a bypass line (44) for introducing the fluid from the cooling part to the exhaust passage by bypassing the turbine, the bypass line branching from the return line, and a communication state switching part (60) for controlling a communication state between the extraction line and the combustor casing via the return line, and a communication state between the extraction line and the exhaust passage via the bypass line. The communication state switching part is configured to, during an operation of the gas turbine apparatus at a first load (L1), cause the extraction line and the combustor casing to communicate with each other via the return line, and shut off a communication between the extraction line and the exhaust passage via the bypass line, and during an operation of the gas turbine apparatus at a second load (L2) which is lower than the first load, shut off a communication between the extraction line and the combustor casing via the return line, and cause the extraction line and the exhaust passage to communicate with each other via the bypass line.

In the above configuration (1), with the communication state switching part, it is possible to switch the communication state between the extraction line and the combustor casing via the return line, and the communication state between the extraction line and the exhaust passage via the bypass line, in accordance with the change in load of the gas turbine apparatus. That is, in the above configuration (1), during the operation at the first load of the relatively high load, the communication state switching part causes the extraction line and the combustor casing to communicate with each other via the return line, and shuts off the communication between the extraction line and the exhaust passage via the bypass line. Therefore, during the operation at the first load, a part of the fluid (typically, the air) cooled by the cooling part is returned to the combustor casing via the return line connected to the extraction line, and is supplied to the combustor to be used for fuel combustion. Moreover, in the above configuration (1), during the operation at the second load of the relatively low load, the communication state switching part shuts off the communication between the extraction line and the combustor casing via the return line, and causes the extraction line and the exhaust passage to communicate with each other via the bypass line. Therefore, during the operation at the second load, a part of the fluid cooled by the cooling part is discharged to the exhaust passage by bypassing the combustor and the turbine, via the bypass line branching from the return line.

Thus, in the above configuration (1), since a part of the fluid from the cooling part is returned to the combustor casing via the return line in the high-load operation, and is discharged by bypassing the combustor and the turbine via the bypass line in the low-load operation, it is possible to effectively reduce the amount of the fluid (typically, the air) supplied to the combustor in the low-load operation, as compared with the high-load operation. Thus, it is possible to reduce the CO emission by increasing the turbine inlet temperature in the low-load operation.

Moreover, in the above configuration (1), since the bypass line is disposed so as to branch from the return line, it is possible to install the bypass line relatively easily by a method for connecting the pipe forming the bypass line to the pipe forming the return line, for example. Thus, it is possible to suppress the increase in manufacturing cost of the gas turbine apparatus.

Therefore, with the above configuration (1), it is possible to effectively suppress the increase in CO emission during the operation at the relatively low load, while effectively suppressing the increase in cost.

(2) In some embodiments, in the above configuration (1), the communication state switching part (60) includes at least one valve (for example, the return valve 62, the bypass valve 64, or the three-way valve 66) capable of switching at least one of the communication state between the extraction line and the combustor casing via the return line, or the communication state between the extraction line and the exhaust passage via the bypass line, and a control part (for example, the control device 100) for controlling opening and closing of the valve.

With the above configuration (2), it is possible to implement the communication state switching part with the simple configuration including the valve and the control part. Thus, it is possible to effectively suppress the increase in CO emission during the operation at the relatively low load, while effectively suppressing the increase in cost.

(3) In some embodiments, in the above configuration (2), the at least one valve includes a return valve (62) disposed downstream of a branch position (40) of the bypass line in the return line (42), the return valve being capable of switching the communication state between the extraction line and the combustor casing via the return line, and a bypass valve (64) disposed in the bypass line (44), and capable of switching the communication state between the extraction line and the exhaust passage via the bypass line, and the control part is configured to, during the operation of the gas turbine apparatus at the first load, open the return valve and close the bypass valve, and during the operation of the gas turbine apparatus at the second load, close the return valve and open the bypass valve.

With the above configuration (3), it is possible to implement the communication state switching part with the simple configuration including the return valve disposed in the return line, the bypass valve disposed in the bypass line, and the control part for controlling the return valve and the bypass valve. Thus, it is possible to effectively suppress the increase in CO emission during the operation at the relatively low load, while effectively suppressing the increase in cost.

(4) In some embodiments, in the above configuration (2), the at least one valve includes a three-way valve (66) disposed at a branch position of the bypass line in the return line, the three-way valve being capable of switching the communication state between the extraction line and the combustor casing via the return line, and the communication state between the extraction line and the exhaust passage via the bypass line.

With the above configuration (4), it is possible to implement the communication state switching part with the simple configuration including the three-way valve disposed at the branch position of the bypass line in the return line and the control part for controlling the three-way valve. Thus, it is possible to effectively suppress the increase in CO emission during the operation at the relatively low load, while effectively suppressing the increase in cost.

(5) In some embodiments, in any one of the above configurations (1) to (4), the gas turbine apparatus includes a filter part (36) for collecting foreign substances included in the fluid from the combustor casing, the filter part being disposed in the extraction line downstream of the cooling part. The extraction line communicates with a cooling target part of the turbine downstream of the filter part. The return line is connected to a foreign substance collection space (39) of the filter part disposed in the extraction line.

With the above configuration (5), the clean cooling fluid, that has passed through the filter part to have the foreign substances removed, is supplied to the cooling target part of the turbine via the part of the extraction line downstream of the filter part, and the foreign substances collected in the foreign substance collection space of the filter part are discharged from the filter part together with a part of the fluid supplied to the filter part, via the return line connected to the foreign substance collection space. That is, with the above configuration (5), since the return line and the bypass line can be formed by using the line for discharging the foreign substances from the filter part, it is possible to simplify the structure of the gas turbine apparatus.

(6) In some embodiments, in any one of the above configurations (1) to (5), the gas turbine apparatus further includes a discharge line (80) for introducing the fluid from the cooling part to the exhaust passage by bypassing the turbine, the discharge line branching from the return line or the bypass line.

In the above configuration (6), since the discharge line for introducing the cooling fluid from the cooling part to the exhaust passage by bypassing the turbine is provided aside from the bypass line, it is possible to install the bypass line relatively easily. For example, using a space in the vicinity of a discharge line, which does not satisfy the specifications (such as a pipe diameter) of the bypass line, as the installation space for the bypass pipe with respect to the gas turbine apparatus that originally includes the discharge line, it is possible to install the bypass line relatively easily. Thus, with the above configuration (6), it is possible to effectively suppress the increase in CO emission during the operation at the relatively low load, while suppressing the manufacturing cost of the gas turbine apparatus more effectively.

(7) In some embodiments, in the above configuration (6), a diameter of a pipe forming the bypass line is larger than a diameter of a pipe forming the discharge line.

With the above configuration (7), since the diameter of the pipe of the bypass line is larger than that of the pipe of the discharge line, the flow rate inside the bypass line is not increased too much. Thus, it is possible to reduce risks of the vibration, noise, and the like when the fluid from the cooling part flows toward the exhaust passage via the bypass line.

(8) In some embodiments, in any one of the above configurations (1) to (7), the communication state switching part is configured to, at a time of a transition from the operation at the first load to the operation at the second load, shut off the communication between the extraction line and the combustor casing via the return line, and then to cause the extraction line and the exhaust passage to communicate with each other via the bypass line.

The pressure of the exhaust passage positioned on an outlet side of the turbine is low, relative to the combustor casing supplied with the high-pressure fluid. Thus, in the state where the return line and the bypass line communicate with each other, the flow from the combustor casing to the exhaust passage via the return line and the bypass line occurs, decreasing efficiency of the gas turbine apparatus in this case. In this regard, with the above configuration (8), since, at the time of the transition from the operation at the relatively high load (first load) to the operation at the lower load (second load), the communication between the extraction line and the combustor casing via the return line is shut off, and then the extraction line and the exhaust passage are caused to communicate with each other via the bypass line, the return line and the bypass line do not communicate with each other, hardly causing the flow from the combustor casing to the exhaust passage via the return line and the bypass line. Therefore, with the above configuration (8), it is possible to effectively suppress the increase in CO emission during the operation at the relatively low load, while suppressing the decrease in efficiency of the gas turbine apparatus as well as suppressing the increase in cost.

(9) In some embodiments, in any one of the above configurations (1) to (8), the gas turbine apparatus includes a control part for functioning as a part of the communication state switching part and controlling the operation of the gas turbine apparatus. The control part is configured to, during the operation of the gas turbine apparatus at the first load, if an abnormality occurs such that it is impossible to cause the extraction line and the combustor casing to communicate with each other via the return line, cause the extraction line and the exhaust passage to communicate with each other via the bypass line and to cause the gas turbine apparatus to transit to the operation at the second load.

If a part of the fluid from the cooling part is returned to the combustor casing via the return line, the cooling effect of the combustor casing by the fluid is obtained. During the operation at the first load of the relatively high load, if the abnormality occurs such that it is impossible to cause the extraction line and the combustor casing to communicate with each other via the return line, the cooling effect of the combustor casing by the fluid from the return line is decreased. If the high-load operation is continued in this state, the temperatures of the combustor casing and the like may increase excessively.

In this regard, with the above configuration (9), the extraction line and the exhaust passage are caused to communicate with each other via the bypass line, and the transition to the operation at the second load of the lower load is made, if the above-described abnormality occurs. Thus, it is possible to effectively suppress the increase in CO emission during the operation at the relatively low load, while suppressing the increase in cost as described in the above configuration (1).

(10) In some embodiments, in any one of the above configurations (1) to (9), the gas turbine apparatus includes a control part for functioning as a part of the communication state switching part and controlling the operation of the gas turbine apparatus. The control part is configured to, during the operation of the gas turbine apparatus at the first load, if an abnormality occurs such that it is impossible to shut off the communication between the extraction line and the exhaust passage via the bypass line, cause the gas turbine apparatus to transit to the operation at the second load.

During the operation at the first load of the relatively high load, if the abnormality occurs such that it is impossible to shut off the communication between the extraction line and the exhaust passage via the bypass line, the state is obtained in which the return line and the bypass line communicate with each other, causing a flow from the combustor casing to the exhaust passage via the return line and the bypass line. Thus, the flow of the fluid from the cooling part to the combustor casing via the return line is reduced, decreasing the cooling effect of the combustor casing by the fluid. If the high-load operation is continued in this state, the temperatures of the combustor casing and the like may increase excessively.

In this regard, with the above configuration (10), the gas turbine apparatus transits to the operation at the second load of the lower load, if the above-described abnormality occurs. Thus, it is possible to suppress the increase in temperatures of the combustor casing and the like, and to effectively suppress the increase in CO emission during the operation at the relatively low load, while suppressing the increase in cost, as described in the above configuration (1).

(11) In some embodiments, in any one of the above configurations (1) to (10), the gas turbine apparatus includes a control part for functioning as a part of the communication state switching part and controlling the operation of the gas turbine apparatus. The control part is configured to, during the operation of the gas turbine apparatus at the second load, if an abnormality occurs such that it is impossible to shut off the communication between the extraction line and the combustor casing via the return line, output a warning signal.

During the operation at the second load of the relatively low load, if the abnormality occurs such that it is impossible to shut off the communication between the extraction line and the combustor casing via the return line, the state is obtained in which the return line and the bypass line communicate with each other, causing the flow from the combustor casing to the exhaust passage via the return line and the bypass line. Thus, the flow of the fluid from the cooling part to the combustor casing via the return line is reduced, decreasing the cooling effect of the combustor casing by the fluid. Switching to the operation at the first load of the higher load in this state, the temperatures of the combustor casing and the like may increase excessively.

In this regard, with the above configuration (11), since the warning signal is output if the above-described abnormality occurs, the operator or the like can perceive occurrence of the abnormality. Thus, it is possible to effectively suppress the increase in CO emission during the operation at the relatively low load, while suppressing the increase in cost, as described in the above configuration (1), while obviating the excessive increase in temperatures of the combustor casing and the like.

(12) In some embodiments, in any one of the above configurations (1) to (11), the gas turbine apparatus includes a control part for functioning as a part of the communication state switching part and controlling the operation of the gas turbine apparatus. The control part is configured to, during the operation of the gas turbine apparatus at the second load, if an abnormality occurs such that it is impossible to cause the extraction line and the exhaust passage to communicate with each other via the bypass line, cause the extraction line and the combustor casing to communicate with each other via the return line and to output a warning signal.

In the case in which, during the operation at the second load of the relatively low load, the abnormality occurs such that it is impossible to cause the extraction line and the exhaust passage to communicate with each other via the bypass line, it may be impossible to appropriately supply the fluid cooled by the cooling part to the cooling target part, if the state is held in which the communication between the extraction line and the combustor casing via the return line is shut off. Moreover, switching to the operation at the first load of the higher load in this state, the temperatures of the combustor casing and the like may increase excessively.

In this regard, with the above configuration (12), the extraction line and the combustor casing are caused to communicate with each other via the return line, and the warning signal is output, if the above-described abnormality occurs. Thus, it is possible to appropriately maintain the supply of the fluid from the cooling part to the combustor casing via the return line, and to effectively suppress the increase in CO emission during the operation at the relatively low load, while suppressing the increase in cost, as described in the above configuration (1), while obviating the excessive increase in temperatures of the combustor casing and the like.

(13) In some embodiments, in any one of the above configurations (1) to (12), the gas turbine apparatus further includes a compressor (2) for generating a compressed fluid to be supplied to the combustor. The gas turbine apparatus is configured to, during the operation of the gas turbine apparatus at the second load, decrease an opening degree of an inlet guide vane of the compressor, as compared with during the operation at the first load.

With the above configuration (13), adjusting the opening degree of the inlet guide vane of the compressor, the amount of the air (fluid) flowing into the combustor from the compressor is decreased, making it possible to, during the operation at the second load of the relatively low load, increase the turbine inlet temperature of the combustion gas generated by the combustor. Therefore, with the above configuration (13), it is possible to suppress the increase in CO emission during the operation at the relatively low load more effectively.

(14) In some embodiments, in any one of the above configurations (1) to (13), the gas turbine apparatus includes a compressor (2) for generating a compressed fluid to be supplied to the combustor, an intake filter (78) positioned upstream of the compressor, an anti-icing part (75) for blowing the fluid extracted from the combustor casing or the compressor to the intake filter. The gas turbine apparatus is configured to, during the operation at the second load, increase the amount of the fluid blown to the intake filter by the anti-icing part, as compared with during the operation at the first load.

With the above configuration (14), adjusting the amount of the fluid blown to the intake filter by the anti-icing part, it is possible to increase the intake temperature of the compressor and to decrease the amount (mass flow rate) of the fluid supplied from the compressor to the combustor, making it possible to, during the operation at the second load of the relatively low load, increase the turbine inlet temperature of the combustion gas generated by the combustor. Therefore, with the above configuration (14), it is possible to suppress the increase in CO emission during the operation at the relatively low load more effectively.

(15) A manufacturing method for a gas turbine apparatus, which includes a turbine configured to be driven by a combustion gas from a combustor, an exhaust passage configured to allow exhaust air from the turbine to flow, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, and a bypass line for introducing the fluid from the cooling part to the exhaust passage by bypassing the turbine, the bypass line branching from the return line, according to at least one embodiment of the present invention includes a step of connecting an upstream end of a bypass pipe to the return line or another line communicating with the return line to form the bypass line by the bypass pipe.

With the above method (15), since the bypass line is formed by connecting the upstream end of the bypass pipe to the pipe forming the return line or the pipe forming the another line communicating with the return line, it is possible to form the bypass line relatively easily. Thus, it is possible to suppress the increase in manufacturing cost of the gas turbine apparatus.

Moreover, according to the gas turbine apparatus manufactured by the above method (15), a part of the fluid from the cooling part is returned to the combustor casing via the return line in the high-load operation, and is discharged by bypassing the combustor and the turbine via the bypass line in the low-load operation, as described in the above configuration (1), for example. Thus, it is possible to effectively reduce the amount of the fluid (typically, the air) supplied to the combustor in the low-load operation, as compared with the high-load operation. Thus, it is possible to reduce the CO emission by increasing the turbine inlet temperature in the low-load operation.

Therefore, with the above method (15), it is possible to manufacture the gas turbine apparatus capable of effectively suppressing the increase in CO emission during the operation at the relatively low load, while suppressing the increase in cost.

(16) An operation method for a gas turbine apparatus, which includes a turbine configured to be driven by a combustion gas from a combustor, an exhaust passage configured to allow exhaust air from the turbine to flow, an extraction line configured to extract a fluid from a combustor casing, a cooling part disposed in the extraction line and configured to cool the fluid, a return line for returning the fluid from the cooling part to an inside of the combustor casing, the return line being connected to the extraction line downstream of the cooling part, and a bypass line for introducing the fluid from the cooling part to the exhaust passage by bypassing the turbine, the bypass line branching from the return line, according to at least one embodiment of the present invention includes, during an operation of the gas turbine apparatus at a first load, a step of operating the gas turbine apparatus in a state in which the extraction line and the combustor casing are caused to communicate with each other via the return line, and the communication between the extraction line and the exhaust passage via the bypass line is shut off, and a step of shutting off the communication between the extraction line and the combustor casing via the return line, and causing the extraction line and the exhaust passage to communicate with each other via the bypass line, at a time of switching from the operation of the gas turbine apparatus at the first load to an operation at a second load which is lower than the first load.

In the above method (16), it is possible to switch the communication state between the extraction line and the combustor casing via the return line, and the communication state between the extraction line and the exhaust passage via the bypass line, in accordance with the change in load of the gas turbine apparatus. That is, in the above method (16), during the operation at the first load of the relatively high load, the communication state switching part causes the extraction line and the combustor casing to communicate with each other via the return line, and shuts off the communication between the extraction line and the exhaust passage via the bypass line. Therefore, during the operation at the first load, a part of the fluid (typically, the air) cooled by the cooling part is returned to the combustor casing via the return line connected to the extraction line, and is supplied to the combustor to be used for fuel combustion. Moreover, in the above method (16), during the operation at the second load of the relatively low load, the communication state switching part shuts off the communication between the extraction line and the combustor casing via the return line, and causes the extraction line and the exhaust passage to communicate with each other via the bypass line. Therefore, during the operation at the second load, a part of the fluid cooled by the cooling part is discharged to the exhaust passage by bypassing the combustor and the turbine, via the bypass line branching from the return line.

Thus, in the above method (16), since a part of the fluid from the cooling part is returned to the combustor casing via the return line in the high-load operation, and is discharged by bypassing the combustor and the turbine via the bypass line in the low-load operation, it is possible to effectively reduce the amount of the fluid (typically, the air) supplied to the combustor in the low-load operation, as compared with the high-load operation. Thus, it is possible to reduce the CO emission by increasing the turbine inlet temperature in the low-load operation.

Moreover, in the above method (16), since the bypass line is disposed so as to branch from the return line, it is possible to install the bypass line relatively easily by a method for connecting the pipe forming the bypass line to the pipe forming the return line, for example. Thus, it is possible to suppress the increase in manufacturing cost of the gas turbine apparatus.

Therefore, with the above method (16), it is possible to effectively suppress the increase in CO emission during the operation at the relatively low load, while suppressing the increase in cost.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "containing" or "having" one constitutional element is not an exclusive expression that excludes the presence of other constitutional elements.

The invention claimed is:

1. A gas turbine apparatus, comprising:
a turbine configured to be driven by a combustion gas from a combustor;
an exhaust passage configured to allow exhaust air from the turbine to flow;
an extraction line configured to extract a fluid from a combustor casing;
a cooling part disposed in the extraction line and configured to cool the fluid;
a return line for returning the fluid from the cooling part to an inside of the combustor casing, the return line being connected to the extraction line downstream of the cooling part;
a bypass line for introducing the fluid from the cooling part to the exhaust passage by bypassing the turbine, the bypass line branching from the return line; and
at least one valve capable of controlling at least one of a communication state between the extraction line and the combustor casing via the return line, or a communication state between the extraction line and the exhaust passage via the bypass line,
wherein the at least one valve is configured to:
during an operation of the gas turbine apparatus at a first load, cause the extraction line and the combustor casing to communicate with each other via the return line, and shut off communication between the extraction line and the exhaust passage via the bypass line; and
during an operation of the gas turbine apparatus at a second load which is lower than the first load, shut off communication between the extraction line and the combustor casing via the return line, and cause the extraction line and the exhaust passage to communicate with each other via the bypass line,
wherein the gas turbine apparatus comprises a filter part for collecting foreign substances included in the fluid from the combustor casing, the filter part being disposed in the extraction line downstream of the cooling part,
wherein the extraction line communicates with a cooling target part of the turbine downstream of the filter part and is configured such that the fluid having foreign substances removed by the filter part is introduced to the extraction line downstream of the filter part, and
wherein the return line is connected to a foreign substance collection space of the filter part disposed in the extraction line and is configured such that the fluid containing the foreign substances collected in the foreign substance collection space is introduced to the return line.

2. The gas turbine apparatus according to claim 1, comprising a control device for controlling opening and closing of the at least one valve,
wherein the at least one valve includes:
a return valve disposed downstream of a branch position of the bypass line in the return line, the return valve being capable of switching the communication state between the extraction line and the combustor casing via the return line; and
a bypass valve disposed in the bypass line, and capable of switching the communication state between the extraction line and the exhaust passage via the bypass line, and
wherein the control device is configured to:
during the operation of the gas turbine apparatus at the first load, open the return valve and close the bypass valve; and
during the operation of the gas turbine apparatus at the second load, close the return valve and open the bypass valve.

3. The gas turbine apparatus according to claim 1,
wherein the at least one valve includes a three-way valve disposed at a branch position of the bypass line in the return line, the three-way valve being capable of switching the communication state between the extraction line and the combustor casing via the return line, and the communication state between the extraction line and the exhaust passage via the bypass line.

4. The gas turbine apparatus according to claim 1, further comprising a discharge line for introducing the fluid from the cooling part to the exhaust passage by bypassing the turbine, the discharge line branching from the return line or the bypass line.

5. The gas turbine apparatus according to claim 4,
wherein a diameter of a pipe forming the bypass line is larger than a diameter of a pipe forming the discharge line.

6. The gas turbine apparatus according to claim 1,
wherein the at least one valve is configured to, at a time of a transition from the operation at the first load to the operation at the second load, shut off the communication between the extraction line and the combustor casing via the return line, and then to cause the extraction line and the exhaust passage to communicate with each other via the bypass line.

7. The gas turbine apparatus according to claim 1, comprising a control device for controlling the operation of the gas turbine apparatus,
wherein the control device is configured to, during the operation of the gas turbine apparatus at the first load, if an abnormality occurs such that it is impossible to cause the extraction line and the combustor casing to communicate with each other via the return line, control opening and closing of the at least one valve so as to cause the extraction line and the exhaust passage to communicate with each other via the bypass line and to cause the gas turbine apparatus to transition to the operation at the second load.

8. The gas turbine apparatus according to claim 1, comprising a control device for controlling the operation of the gas turbine apparatus,
wherein the control device is configured to, during the operation of the gas turbine apparatus at the first load, if an abnormality occurs such that it is impossible to shut off the communication between the extraction line and the exhaust passage via the bypass line, cause the gas turbine apparatus to transition to the operation at the second load.

9. The gas turbine apparatus according to claim 1, comprising a control device for controlling the operation of the gas turbine apparatus,
wherein the control device is configured to, during the operation of the gas turbine apparatus at the second load, if an abnormality occurs such that it is impossible to shut off the communication between the extraction line and the combustor casing via the return line, output a warning signal.

10. The gas turbine apparatus according to claim 1, comprising a control device for controlling the operation of the gas turbine apparatus,
wherein the control device is configured to, during the operation of the gas turbine apparatus at the second load, if an abnormality occurs such that it is impossible to cause the extraction line and the exhaust passage to communicate with each other via the bypass line, control opening and closing of the at least one valve so as to cause the extraction line and the combustor casing to communicate with each other via the return line and to output a warning signal.

11. The gas turbine apparatus according to claim 1, further comprising a compressor for generating a compressed fluid to be supplied to the combustor,
wherein the gas turbine apparatus is configured to, during the operation of the gas turbine apparatus at the second load, decrease an opening degree of an inlet guide vane of the compressor, as compared with during the operation at the first load.

12. An operation method for the gas turbine apparatus according to claim 1,
the method comprising:
during the operation of the gas turbine apparatus at the first load, a step of operating the gas turbine apparatus in the communication state in which the extraction line and the combustor casing are caused to communicate with each other via the return line, and the communication between the extraction line and the exhaust passage via the bypass line is shut off; and
a step of shutting off the communication between the extraction line and the combustor casing via the return line, and causing the extraction line and the exhaust passage to communicate with each other via the bypass line, at a time of switching from the operation of the gas turbine apparatus at the first load to the operation at the second load which is lower than the first load.

13. A manufacturing method for a gas turbine apparatus including:
a turbine configured to be driven by a combustion gas from a combustor;
an exhaust passage configured to allow exhaust air from the turbine to flow;
an extraction line configured to extract a fluid from a combustor casing;
a cooling part disposed in the extraction line and configured to cool the fluid;
a return line for returning the fluid from the cooling part to an inside of the combustor casing, the return line being connected to the extraction line downstream of the cooling part;
a bypass line for introducing the fluid from the cooling part to the exhaust passage by bypassing the turbine, the bypass line branching from the return line;
at least one valve capable of controlling at least one of a communication state between the extraction line and the combustor casing via the return line, or a communication state between the extraction line and the exhaust passage via the bypass line; and
a filter part for collecting foreign substances included in the fluid from the combustor casing, the filter part being disposed in the extraction line downstream of the cooling part,
wherein the extraction line communicates with a cooling target part of the turbine downstream of the filter part and is configured such that the fluid having foreign substances removed by the filter part is introduced to the extraction line downstream of the filter part, and
wherein the return line is connected to a foreign substance collection space of the filter part disposed in the extraction line and is configured such that the fluid containing the foreign substances collected in the foreign substance collection space is introduced to the return line,
the method comprising a step of connecting an upstream end of the bypass line to the return line or another line communicating with the return line to form the bypass line.

* * * * *